United States Patent [19]

Wittenburg

[11] Patent Number: 4,771,469

[45] Date of Patent: Sep. 13, 1988

[54] MEANS AND METHOD OF REPRESENTING AN OBJECT SHAPE BY HIERARCHICAL BOUNDARY DECOMPOSITION

[75] Inventor: Timothy M. Wittenburg, St. Paul, Minn.

[73] Assignee: Honeywell Inc., Minneapolis, Minn.

[21] Appl. No.: 880,233

[22] Filed: Jun. 30, 1986

[51] Int. Cl.[4] .............................................. G06K 9/46
[52] U.S. Cl. .......................................... 382/25; 382/6
[58] Field of Search ................................ 382/25, 28, 6

[56] References Cited

U.S. PATENT DOCUMENTS

| 4,048,615 | 9/1977 | Chuang et al. |
| 4,097,845 | 6/1978 | Bacus. |
| 4,183,013 | 1/1980 | Agrawala et al. |
| 4,361,830 | 11/1982 | Honma et al. |

FOREIGN PATENT DOCUMENTS 0041136 4/1978 Japan ..................................... 382/25

Primary Examiner—Theodore M. Blum
Attorney, Agent, or Firm—William T. Udseth; Wayne B. Easton; John G. Shudy, Jr.

[57] ABSTRACT

Information on the shape of an object is extracted by generating an image of the object, encoding and ordering the boundary points of the image, selecting points on the outermost portions of the boundary, partitioning the boundary at the selected points into segments of either a first or second kind wherein the segments are distinguished according to a selected smoothness test, and segments of the first kind are smoother than segments of the second kind, partitioning each segment of the second kind into segments of the first or second kind according to the above test, and continuing the partitioning of each of the segments of the second kind into segments of the first or second kind until no further segments of the second kind are identified. An apparatus for performing the above steps is also disclosed.

6 Claims, 9 Drawing Sheets

HBD IN "BREADTH FIRST" MODE

HBD-GENERAL

HBD IN "DEPTH FIRST" MODE $|\vec{V_X}| = b, \; |\vec{V_Y}| = c$

MEANS AND METHOD OF REPRESENTING AN OBJECT SHAPE BY HIERARCHICAL BOUNDARY DECOMPOSITION

BACKGROUND OF THE INVENTION

1. Field of the Invention

This invention relates to means and methods of processing an object image to extract information on the shape of the object. The invention employs successively finer levels of analysis of segments of the objects boundary by an iterative process.

2. Related Art

The problem of quantitatively describing the shape of an object is central to the field of image processing (IP). Although shape description techniques have been developed for such diverse purposes as character recognition, classification of tactical targets, and assembly line inspection, none of these systems meet current needs and the demand for improved performance at less cost.

Hu and Alt in 1962 described certain boundary moment approximtaions which exhibited rotationally invariant shape information. Using fourier boundary descriptions, Cosgriff and Brill in 1968 demonstrated that the shape of numerals could be quantified and reconstructed with varying degrees of resolution, depending on how many coefficients were used. Both the above techniques are computationally very expensive. The widely investigated Medial Axis Transformation (MAT) or skeletonization first reported by H. Blum in 1968 has also shown promise. However, it is generally conceded that MAT is very sensitive to boundary noise and generally requires presmoothing, which itself uses additional parameters that are difficult to automate.

Much research in character recognition has been founded on the premise that handwritten characters are composed of pen stroke primitives. One example of this approach is W. W. Stallings' stroke based Chinese character recognizer, "Chinese Character Recognition", *Syntatic Pattern Recognition Applications,* Springer-Verlag (1977) pp. 95–123. T. Pavlidis and H. Y. F. Feng in "Shape Discrimination", *Syntatic Pattern Recognition Applications,* Springer-Verlag (1977), pp. 125–145, reported an approach which decomposes object shape into a series of convex polygons. Although the aforementioned represent significant achievements, techniques such as polygonal decomposition and skeletonization either are frauhht with algorithmic constraints such as presmoothing or are computationally too expensive to present a realistic option for real time IP systems today. Consequently, many IP systems are forced to rely on simple features such as length to width ratio and perimeter to supply gross shape information to an object classifier. There is a clear need for a computationally inexpensive technique for extracting detailed shape information from a scene.

SUMMARY OF THE INVENTION

The present invention includes a method for extracting information on the shape of an object by:
 (a) generating an image of the object,
 (b) encoding and ordering the boundary points of the object,
 (c) selecting a set of n points, wherein each of the set of points lies on the outermost portions of the boundary,
 (d) partitioning the boundary into segments of either a first or second kind, wherein the end points of either kind of segment are two points from the set of outermost boundary points and wherein segments of the first kind are smoother than segments of the second kind according to a selected smoothness test,
 (e) partitioning each segment of the second kind into segments of either the first or second kind according to the above smoothness test, and
 (f) continuing partitioning segments of the second kind according to step (e) until no segments of the second kind are further identified.

More particularly, in step (c) of the method of the present invention, the set of n points are, preferably, the "convex hull" points. The convex hull points are identified by selecting a reference point (lying outside the object age) and a reference line, and identifying the first convex hull point. The first convex hull point is that boundary point, which when connected by a line to a suceeding boundary point, forms the minimum angle with the reference line of all of the boundary points. The first convex hull point then becomes the reference point and the next convex hull point is identified in the same manner as the first convex hull point. The convex hull point selection process continues until the first convex hull point is again identified as a convex hull point.

In addition to the above basic method of the present invention, whenever a segment of the second kind is identified, any of a number of shape descriptors can be determined for each segment of the second kind to further characterize that segment and therefore the object.

Apparatus corresponding to the above method is also part of the present invention.

The basic method is further embellished by techniques to minimize the number of boundary points that are processed and for combining adjacent segments of the boundary when the curvature of the adjacent segments is relatively gradual.

The method of the present invention will be referred to as hierarchical boundary decomposition (HBD).

DESCRIPTION OF THE PREFERRED EMBODIMENT

Figure 1:
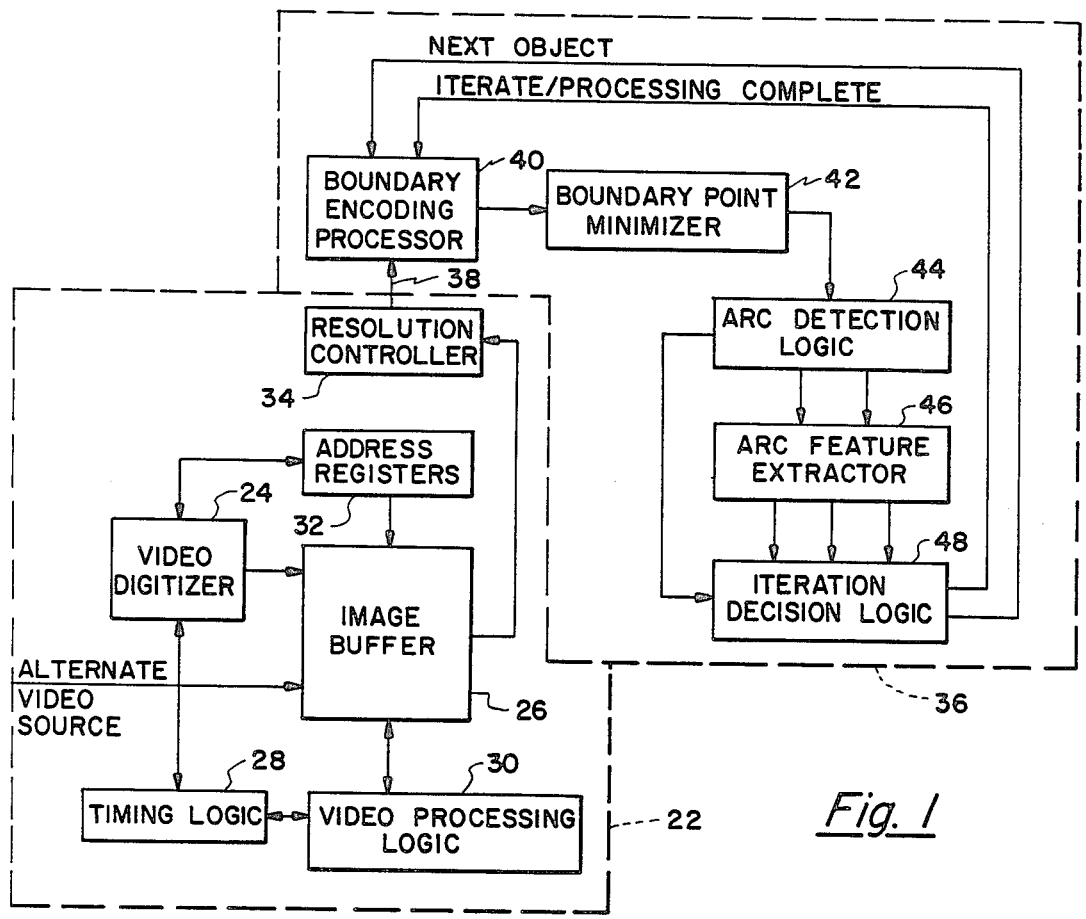
FIG. 1 is a hardware block diagram of a system suitable for HBD.

The invention presumes generation of a two-dimensional image representing the shape of an object. Preferably the image is a digital image. Many current systems are suitable for supplying such an image. The image will be processed by the present invention. HB system 20 in FIG. 1 includes conventional components which will generate the two-dimensional digital image.

That is, the system for generating the two-dimensional digital image (i.e. the blocks within dashed line 22, includes a video digitizer 24, image buffer 26, timing logic 28, digital processing logic 30, address register 32 and resolution controller 34. All components within dashed line 22 are typically combined into a single device. For example, an International Imaging Systems (IIS) model 70 video digitizer (made by Stanford Research Institute) includes all of the above components within dashed line 22 and is suitable for many applications of the HBD process. Of course, as with any digitizer, its memory capacity may not be sufficient for a particular application, the resolution may be insufficient for a particular application or simply the speed with which a digital image is produced may be insufficient. Systems with increased capabilities in these areas can be used with the presen invention if desired.

The IIS model 70 video digitizer, as with most video digitizers, interfaces with a host computer (represented schematically by dashed line 36 and the blocks within) by inserting a card into a slot in the host computer, the card is designed and selected to make the data format and data busing of a particular video digitizer system 22 compatible with the particular host computer 26 selected. Again these are conventional techniques and hardware. A host computer 36 suitable for many applications of HBD and which can be used directly with an IIS model 70 video digitizer are the Honeywell Level 6/53 computer or a VAX 11/750 computer.

The output from video digitizer system 22 is transmitted on bus line 38. It is, in conventional fashion, a stream of digital signals representative, preferably, of a pixel matrix of a×b dimension with an individual pixel i being uniquely identified by coordinates $(a_i, b_i)$. The digital signals are often a word of several bits including gray scale information for a particular pixel.

Boundary encoding processor 40 identifies the boundary points or pixels, encodes the boundary points and, preferably, orders the boundary points. Encoding and ordering can be accomplished by programming the host computer 36 with a standard encoding technique such as the Freeman chain code. The output from boundary encoding processor 40 will identify all the edge or boundary points, and order them consecutively from some arbitary boundary starting point. Ordering the boundary points consecutively (either clockwise or counterclockwise) is preferred in the present invention since it reduces the number of pixels which are processed within the various levels, as discussed further below.

Boundary point minimizer 42, arc detection logic 44, arc feature extractor 46 and iteration decision logic 48 are, as shown, all included within host computer 36. Each of the blocks shown within host computer 36 can be provided by customized hard- wired data processors or, more typically, by programming a general purpose computer of the kinds described above. The invention will be further described in the form of a programmed general purpose computer. The memory, speed or other capabilities of the host computer 36 can, of course, be tailored to the particular task HBD is assigned.

The program used in the general purpose computer (e.g. host computer 36) will be described with reference to FIGS. 3 through 19. In artificial intelligence, the processing of a digital image of an object shape is often described by a "tree" structure (for example, see FIG. 8). In a tree structure, selected features are identified at a first broad level, and each level is broken down into successively finer levels with each successive level containing more detailed information regarding a portion of the level immediately above it.

Further, techniques for processing this tree structure include, but are not limited to, "breadth first" search (or mode) or "depth first" search (or mode). In breadth first mode, all features at the same level in the tree are processed first before any feature in the next level is processed. In depth first mode, all levels of a first feature or branch are processed before a second feature or branch is processed.

No particular order of detection of the individual nodes in the shape tree is required in the invention, however, breadth first search is preferred. Note that whatever the order of detection of nodes, the common result of the invention is a hierarchical description.

The program used in general purpose computer 36 to accomplish HBD will first be described in general. Thereafter the operation of HBD in breadth first and depth first mode will be described.

Figure 2:
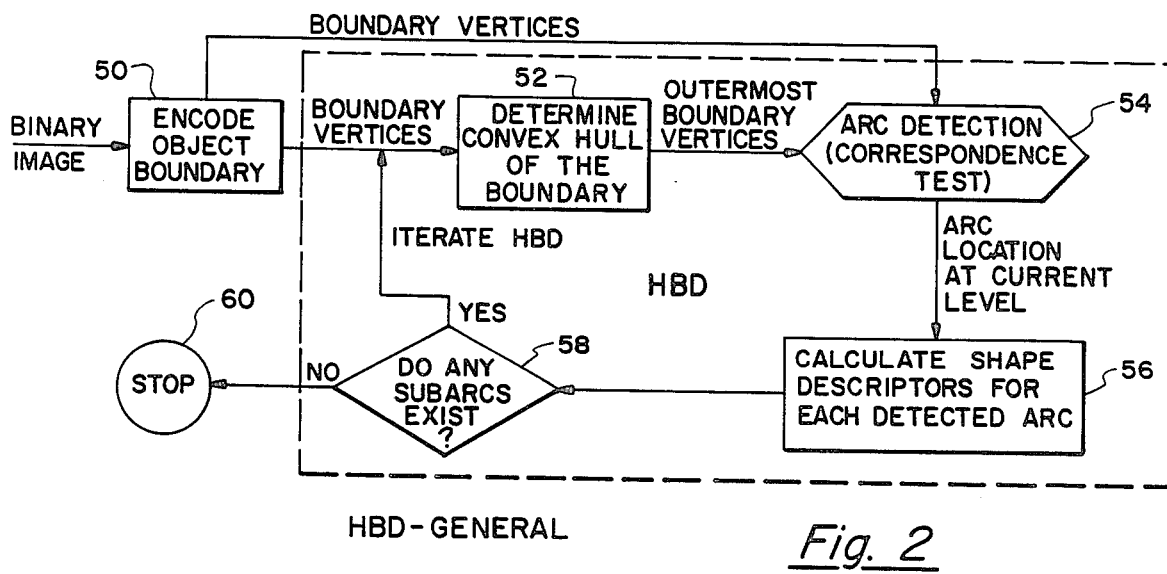
FIG. 2 is a high level flow chart of the general HBD method.

FIG. 2 shows a high level flow chart for HBD. The boundary points are ordered and encoded at 50, the output of step 50 is an ordered set of boundary verticies or points. At step 52, a subset of the boundary points is identified as the points which will be used to partition the boundary into segments. This subset of boundary points are n points lying on the outermost or extremities of the object shape, such that an n sided polygon with each side connecting two of the points of the subset, will roughly enclose most of the shape, and all large depressions or concave areas will be within the polygon.

More particularly, this subset of boundary points are the "convex hull" verticies. The convex hull is defined as the smallest area which can be enclosed by an n sided polygon circumscribing a given set of n points, wherein each side of the polygon includes two of the n points as end-points. The output of step 52 is the subset of n boundary points or, preferably the convex hull verticies or points.

During step 54, the boundary is segmented into segments of either a first or second kind. More specifically, the boundary is divided into a series of consecutive "arcs", either concave or convex. A set of consecutive boundary points are either identified as a segment of a first or second kind (e.g. is either a concave or convex arc) according to selected criteria. The segments should be distingushed by utilizing the outermost points determined from step 52 to identify which segments follow the extremes of the object shape and which segments deviate substantially from the extremes.

In particular, the preferred method of segmenting the boundary employs a correspondence test. If there is a one to one correspondence between a consecutive set of boundary points and a consecutive set of points in the n points identified in step 52, then the set of boundary points satisfying the one to one correspondence test is defined as a "convex arc" (CV). If the correspondence test is not met, then the set of boundary points between (and including) the two points of the n point subset of outermost points where the correspondence failed, is defined as a "concave arc" (CC). Note that by definition a straight line segment is a convex arc.

The output of step 54 is a set of first and/or second segments (e.g. convex and/or concave arcs) at a first level of the shape tree (i.e. level n).

The next step, step 56, is optional and involves calculations at level n of a variety of "shape descriptors". These descriptors give detailed information on the arcs in level n. For example, the depth of a concave arc can now be calculated. Twenty shape descriptors are described below in detail but other descriptors useful in processing some or all of the set of points within a given arc or segment can also be used if desired.

In step 58, the "hierarchical" nature of the process is made explicit. In the most general case, the inquiry is simply "Do subarcs exists?" If the answer is yes, iteration occurs according to whatever mode is selected for constructing the shape tree.

Figure 3:
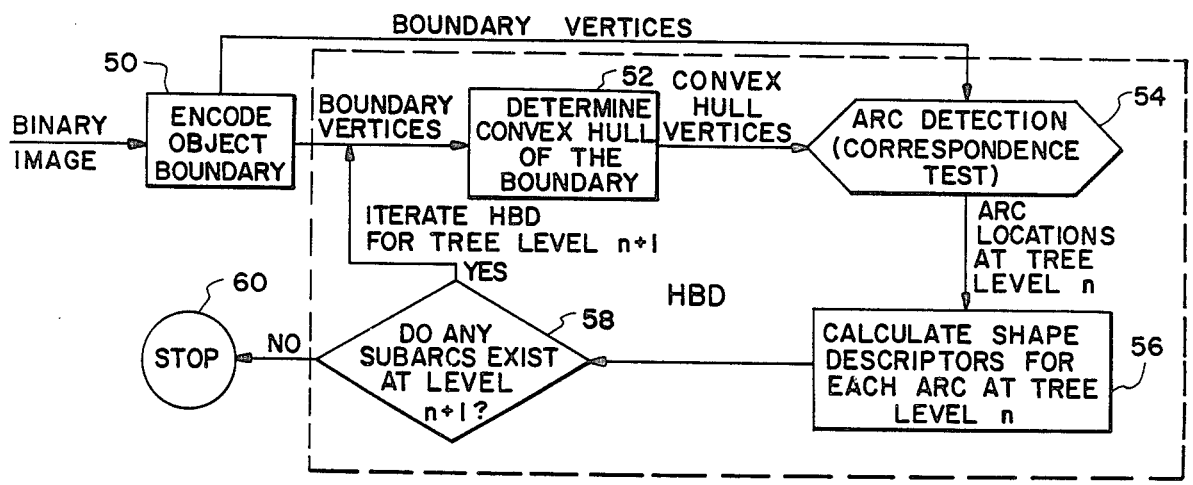
FIG. 3 is high level flow chart of the HBD method in "breadth first" mode.
Figure 8:
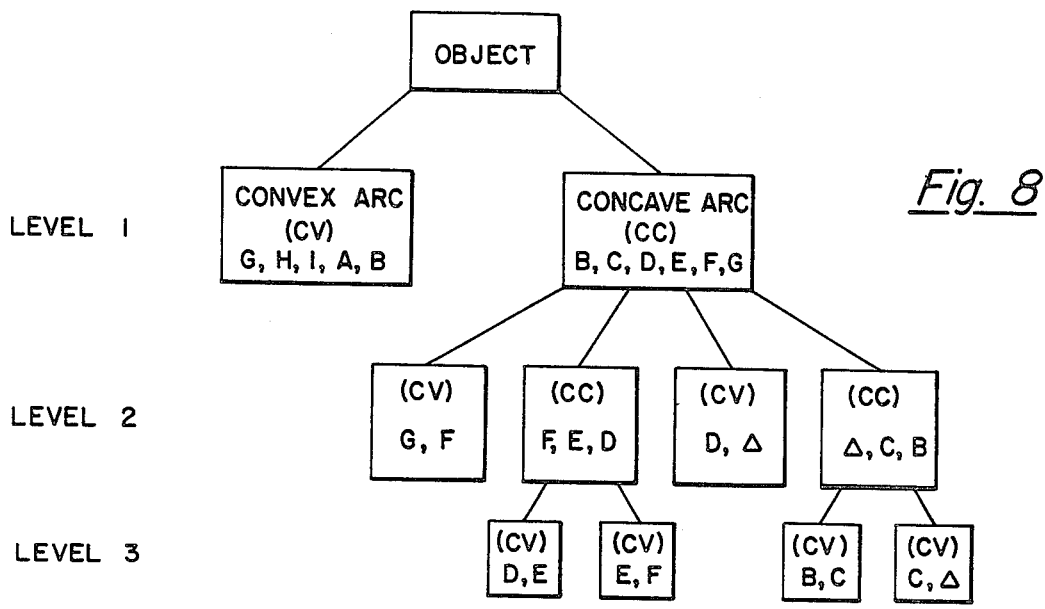
FIG. 8 shows the "shape tree" generated by three levels of HBD applied to the shape in FIG. 4.

FIG. 3 shows a high level flow chart for HBD in breadth first search or mode. Corresponding steps are like-numbered between FIGS. 2 and 3. In breadth first mode, the next level, i.e., level n+1, of the shape tree is examined for "subarcs". Subarcs will appear only within concave arcs (and each decomposible concave arc will include at least two subarcs), but subarcs may be either convex or concave. A brief look at FIG. 8 may be helpful at this point in visualizing a shape tree of multilevels. In FIG. 8 one branch terminates at level 1 and a second branch includes subarcs and terminates at level 3.

If no subarcs exist at the current level, the HBD processes is terminated (step 60). If subarcs exist, HBD is applied again to *each* subarc identified at the current level (i.e. the breadth first approach). This completes the basic HBD breadth first method.

Figure 4:
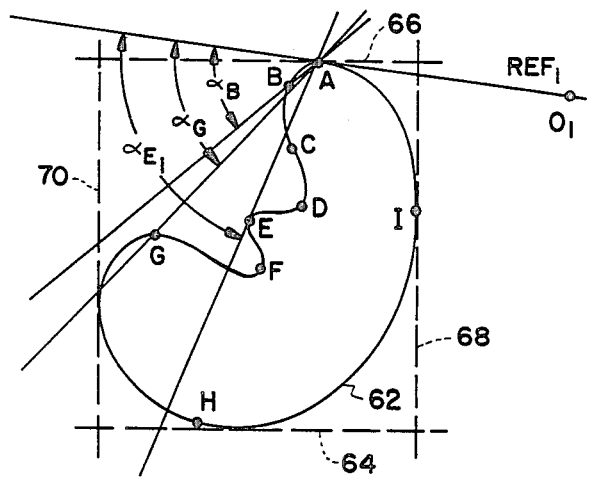
FIGS. 4 through 6 show the HBD method of FIG. 3 applied through part of the first level of decomposition of an arbitary shape.
Figure 5:
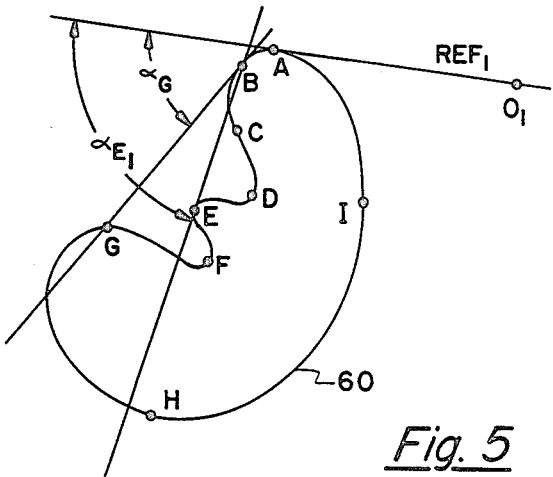
Figure 6:
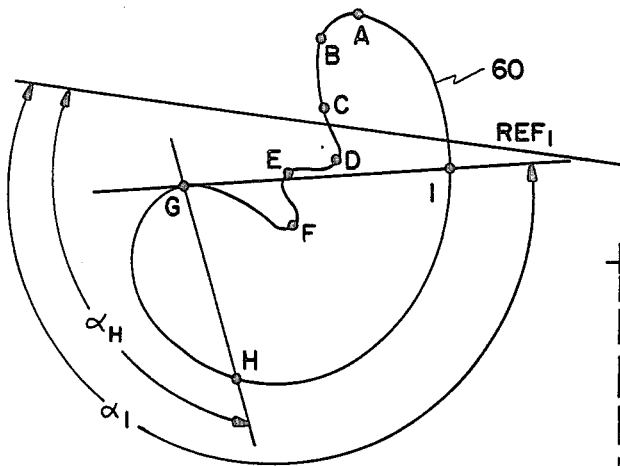
Figure 15:
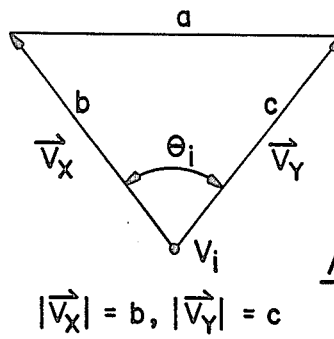
FIG. 15 shows the "corner angles" for each boundary point.

FIGS. 4 through 6 show HBD breadth first through part of its first level for an arbitary shape 62. A digital a×b matrix (not shown) of points depicting FIG. 62 is presumed displayed in FIG. 3. Two othogonal axes (e.g. x and y) are also presumed as the coordinate system used to label the various pixels in the matrix. The x coordinate is parallel to dashed lines 64 and 66, and and y coordinate is parallel to dashed lines 68 and 70.

The following procedure will be implemented by an HBD program in general purpose computer 38. A first reference point $0_1$, which lies outside the maximum x dimension of shape 62 and outside the maximum y dimension of shape 62 (i.e. outside of the rectangle form by line 64 and 66, and lines 68 and 70) is selected. Using either the x or y axis, a reference line is determined, which is formed by passing through point $0_1$ and arbitrarily through one of the boundary points (e.g. point A) in FIG. 4.

Initially a series of direction lines are passed through point A and respectively through all the succeeding boundary points. Only nine boundary points (A, B, C, D, E, F, G, H and I) are shown for simplicity. Of course, typically hundreds of boundary points will be available. In the present example, however, nine direction lines will be determined—one for each of the nine boundary points.

The angle between each of the nine direction lines and the reference axis will be determined (i.e. calculated in a standard manner using the coordinates of $0_1$, the coordinates of the boundary points passing through which the relevant direction lines pass and the location of the reference axis), and the minimum angle of the nine angles selected. The boundary point lying on the direction line forming the minimum angle with the reference axis is selected as the first convex hull point. If more than one direction line has the same minimum angle, any of the boundary points laying on one of these direction lines can be selected, or for convenience, the first of these boundary points according to their ordering can be selected as the first convex hull point.

FIG. 4 shows shape 62 with boundary point A already selected by the above process as the first convex hull point. A first level reference line or direction, $Ref_1$ is selected by using the reference from above (i.e. the x axis) or by the direction defined by a line through $0_1$ and the first convex hull point A. A new series of angle directions or direction lines are determined by connecting point A in turn individually to each of the other boundary points. FIG. 4 shows only three of the possible eight new angle directions or lines, i.e. the three lines connecting points B, G and E individually to point A. The angle measured from $Ref_1$ with each of the three lines are, respectively, $\alpha_B$, $\alpha_G$ and $\alpha_E$. The minimum angle, i.e. $\alpha_B$, is selected. Clearly, if the angle direction had also been determined for the remaining boundary points, i.e. points C, D, F, H and I, the angle from $Ref_1$ associated with each of these remaining directions would have exceeded $\alpha_B$. The boundary point associated with $\alpha_B$, i.e. B, is identified as the second convex hull point because it is the point forming the minimum direction angle with $Ref_1$ from the first convex hull point.

The third convex hull point is determined as shown in FIG. 5. The second identified convex hull point, point B, now becomes in effect (in the algorithm employed in the present invention), the first convex hull point. Angle directions are determined between point B and all boundary points subsequent thereto according to the order of the boundary points. That is, angle directions are determined between point B and each of points C, D, E, F, G, H and I. For simplicity only two of the angle directions in this step are shown in FIG. 5, that is the angle direction for points G and E. The angles between $Ref_1$ and each of these two lines (the lines between points B and G, and points B and E) are determined (i.e. angles $\alpha_G$ and $\alpha_{E1}$) and the minimum angle ($\alpha_G$) selected. The point associated with the minimum angle, point G, is identified as the third convex hull point. Again clearly the angle formed between $Ref_1$ and each of the direction lines for points C, D, F, H and I, would exceed angle $\alpha_G$ so that point G is clearly the next convex hull point in FIG. 5.

The identification of convex hull points continues in the same fashion above. FIG. 6 shows the next step where G now becomes the convex hull point used to generate angle determination directions. Point H will be identified as the next convex hull point.

In a further step using point H as the first convex hull point, point I will also be identified as a convex hull point. The convex hull point identification process will end when the first convex hull point, point A, is again identified as a convex hull point. More generally, when any convex hull point is twice identified as a convex hull point, the identification of the convex hull points is complete and the "generation of a convex hull" is accomplished. In relation to the flow chart of FIG. 3, step 52 is now complete.

The arcs are now identified per step 54 in FIG. 3. More generally, the boundary will be partitioned into segments of either a first or second kind. Preferrably, the boundary will now be segmented into either concave or convex arcs.

Referring to the shape tree in FIG. 8, level 1, the process of FIGS. 4, 5 and 6 and the application of the correspondence test of step 54 will segment the boundary of shape 62 into two parts, a concave arc including points B, C, D, E, F and G, and a convex arc including points G, H, I, A and B. Note that the points between adjacent arcs are included in each arc.

If a convex arc is identified in level 1, that branch of the tree terminates. A convex arc is not decomposed into subarcs. The concave arc at level 1 will be further decomposed. With reference to FIG. 3, arc detection step 54 is now complete.

One can skip step 56 of FIG. 3, calculation of shape descriptor at levels n, if desired and move to step 58—subarc identification. Subarc identification is accomplished by taking each concave arc identified at the current level, *reversing* the order of processing the boundary points from the order used at the immediate preceding level, and applying steps 52 and 54 of FIG. 3 to each concave arc. The process has thus moved to the second level (or level n+1). In the example of shape 62, this means that convex hull points will now be identified on the concave arc shown in FIG. 7.

Figure 7:
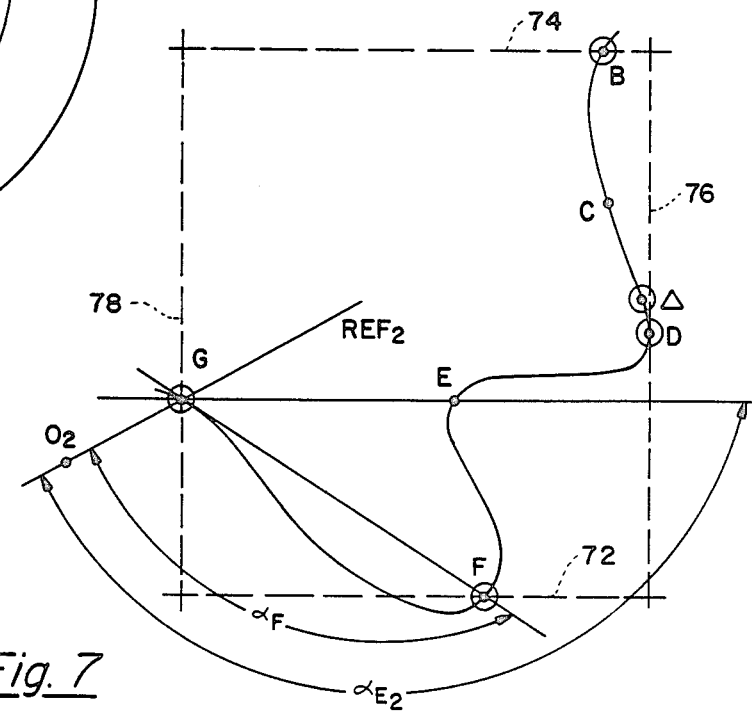
FIG. 7 shows the HBD method of FIG. 3 applied through part of the second level of decomposition of an arc identified as concave by the first level of decomposition.

In FIG. 7 the order of processing boundary points is reversed from that of FIGS. 4 through 6. A new reference point $O_2$, which lies outside the rectangle formed by dashed lines 72, 74, 76 and 78, is selected. A first convex hull point at level 2, point G, is identified by finding the minimum angle between a reference axis and the angles formed by a set of direction lines connecting point $G_2$ to each of the boundary points in FIG. 7. This process results in point G being identified as the first convex hull point at this level. The same process as in FIGS. 4 through 6 is repeated. FIG. 7 shows direction lines joining points G and F, and points G and E with angles $\alpha_F$ and $\alpha_{E2}$ as measured from $\text{Ref}_2$. Angle $\alpha_F$ is smaller than $\alpha_{E2}$, thus point F is identified as the second convex hull point at the second level.

The process continues at the second level, identifying points D, $\Delta$ (a boundary point added to FIG. 7) and B as other convex hull points at level 2. Concave and convex arcs are now identified for level 2. FIG. 8 shows the results of this identification as two concave and two convex arcs at level 2.

Since concave arcs remain at level 2, HBD is applied again (i.e. at level 3) to each of the concave arcs in level 2. The order of processing points in level 3 is the reverse of the order in which points were processed in level 2. In general, all even numbered levels will be processed in the same direction and all odd numbered levels will be processed in the direction opposite to the even numbered levels.

The results of applying HBD to level 3 are shown as the lowest level in FIG. 8. Note that all arcs are now convex and therefore this branch of the tree is terminated at level 3.

Figure 9:
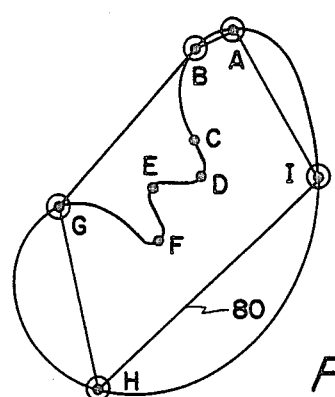
FIG. 9 shows a "convex hull" resulting from a scaled down application of HBD at its first level. The convex hull is superimposed over the shape from which the convex hull points were generated.

On the gross level with which shape 62 is described by only the nine points in FIG. 4, the convex hull would, if superimposed on shape 62, appears as a five sided polygon 80 shown in FIG. 9. The convex hull points are circled.

If many additional boundary points (e.g. hundreds) were included in FIG. 4, the convex hull would be a many sided polygon (see FIG. 10) very nearly tracing the large curve segment 82 of shape 62 between points S and T, and including a straight line segment 84 expanding the large cavity in shape 62 and joining points S and T.

Figure 11A:
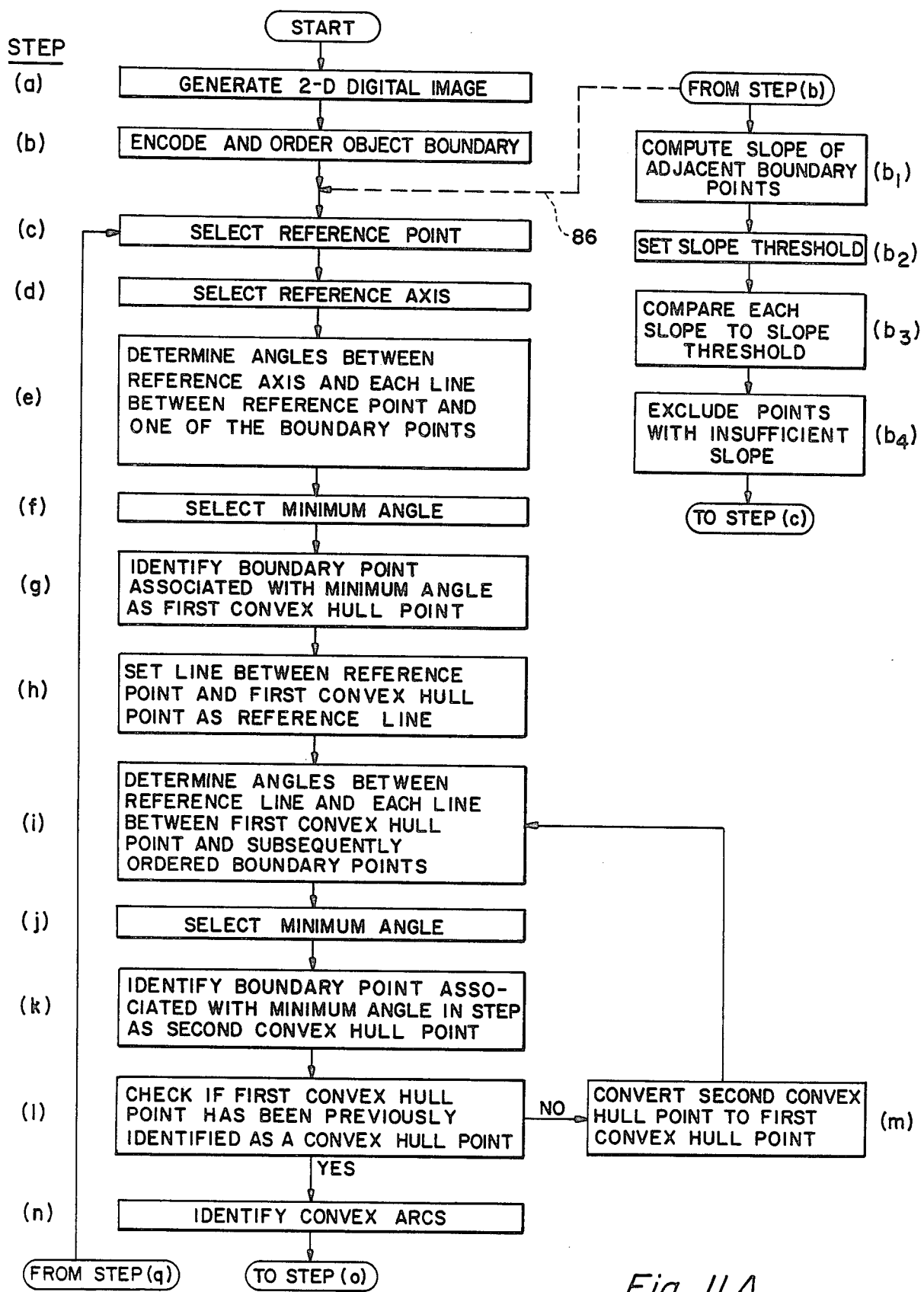
FIGS. 11a and 11b show a flow chart of the HBD method, much expanded as compared to FIG. 3, with optional point minimization and low level smoothing included.
Figure 11B:
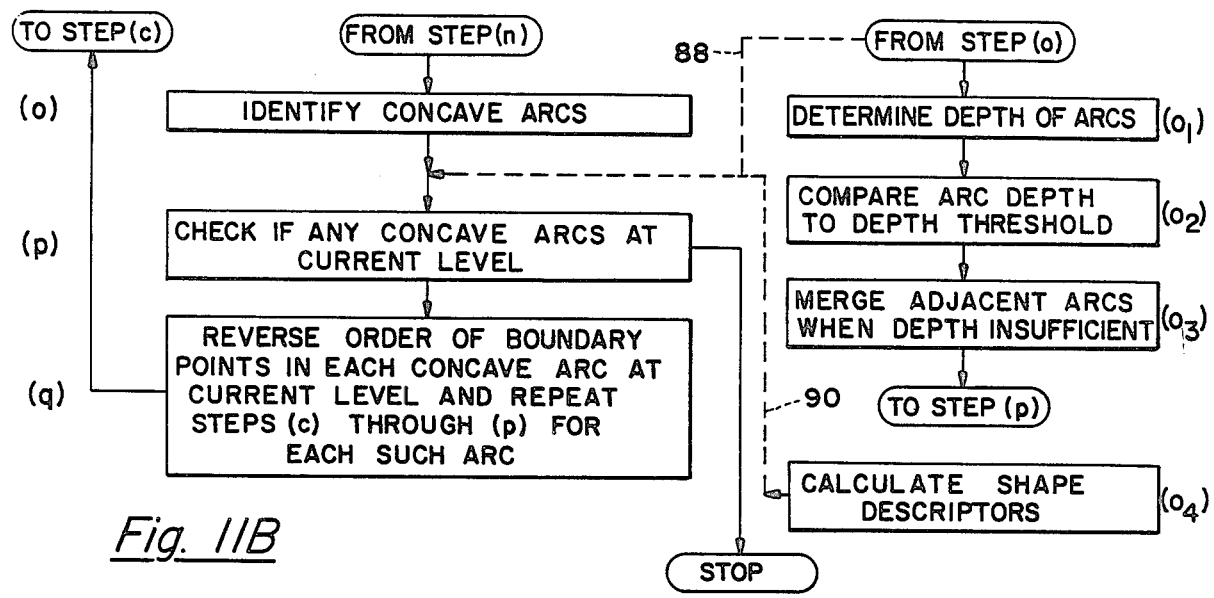
Figure 16A:
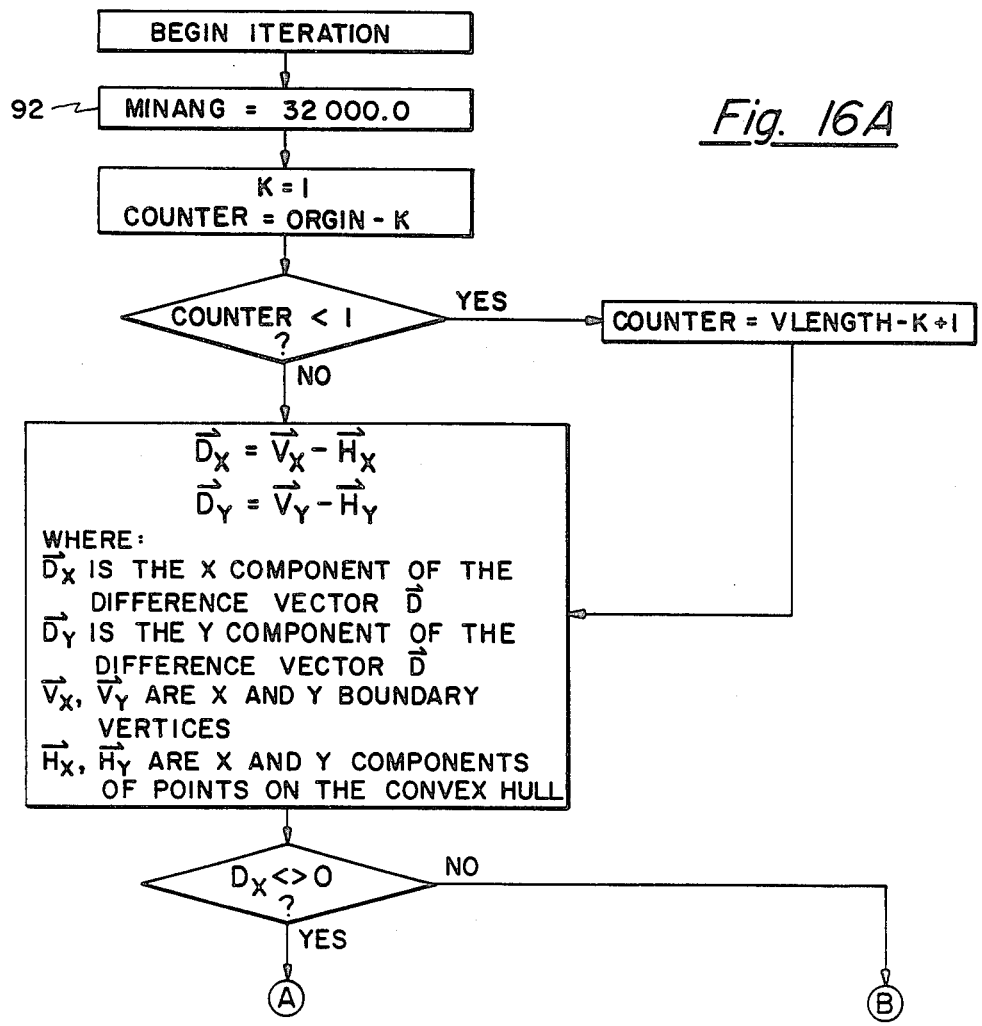
FIG. 16 is an example of a detailed flow chart for generating the convex hull.
Figure 16B:
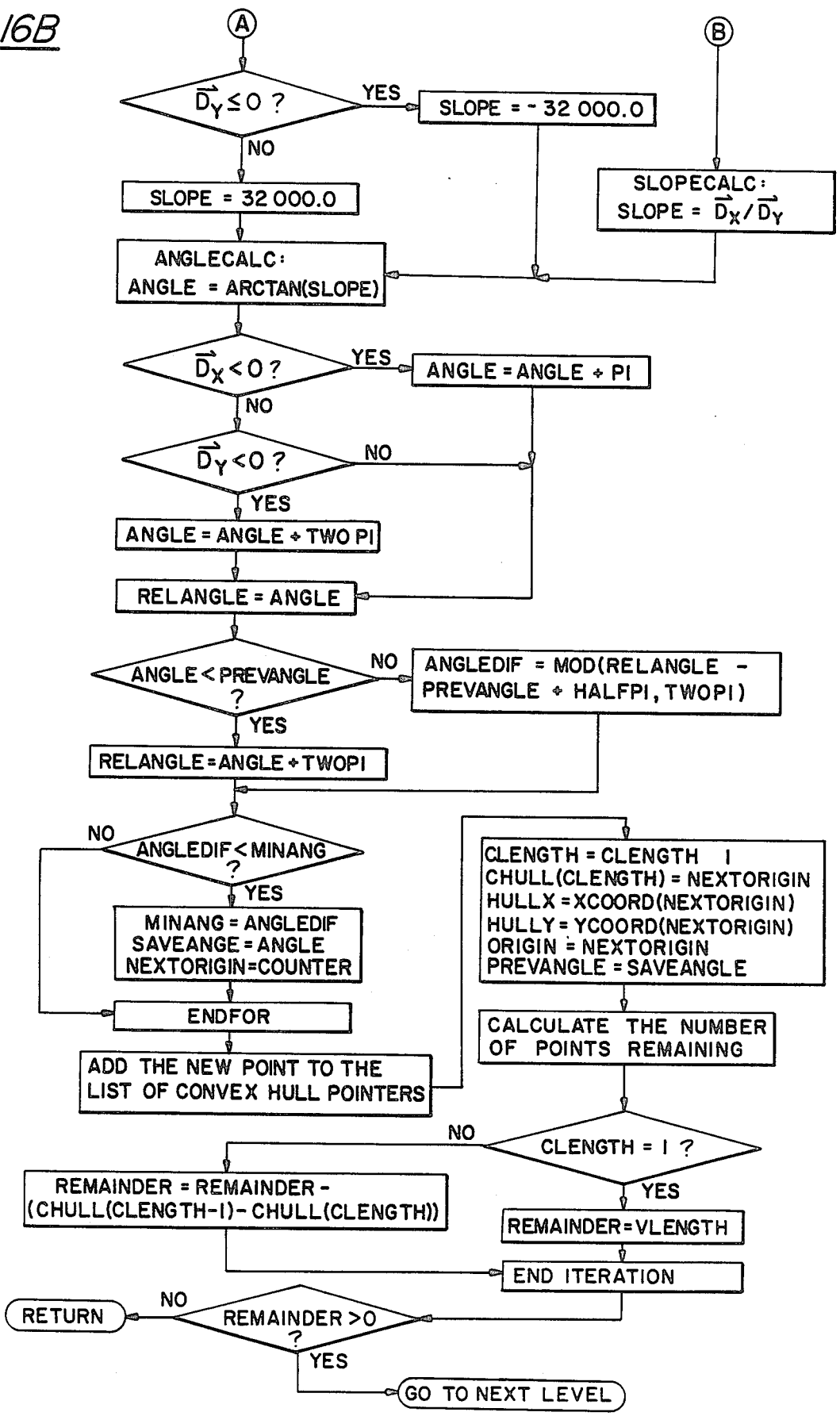

FIGS. 11a and 11b are an expanded flow chart of the process depicted in FIG. 3 (and includes the process of FIGS. 4 through 8). Dashed lines 86, 88 and 90 show optional enhancements. Steps 50, 52, 54, 56 and 58 in FIG. 3 correspond, respectively, to steps b, c–m, n–o, $o_4$, p and q in FIG. 11.

Figure 10:
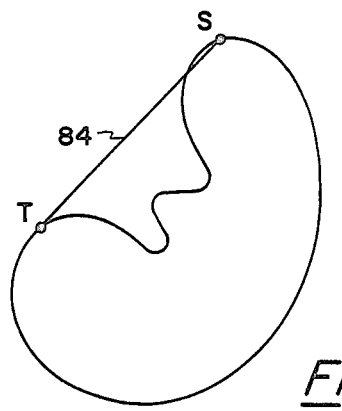
FIG. 10 shows a convex hull resulting from a full scale application of HBD to a shape, with the hull again superimposed as in FIG. 8.

Th routine consisting of steps $b_1$ to $b_4$ in FIG. 11 is called boundary point minimization. If the slope of a line between two adjacent boundary points is sufficiently close to the slope of a line between one of these first two boundary points and the next (a third) boundary point, all three points will be considered included in an arc which is smooth enough to require processing of only one of the points through the HBD algorithm. In FIG. 10, for example, all the points in curve 82, except endpoints S and T, could be skipped. Steps $b_1$ through $b_4$ in FIG. 11 show a convenient way of providing this point minimization function by using a threshold value to determine if the slope between adjacent boundary points warrants processing of the points.

Figure 12:
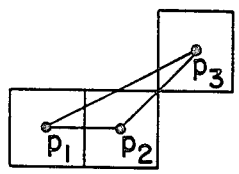
FIG. 12 shows an arc with a depth less than one.
Figure 14:
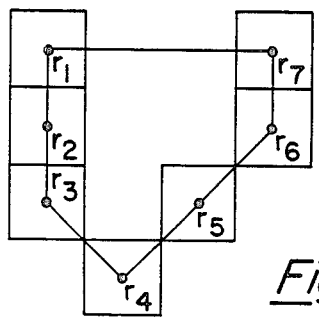
FIG. 14 shows two adjacent arcs each with a depth less than one and the merging of the arcs by low level smoothing.
Figure 13:
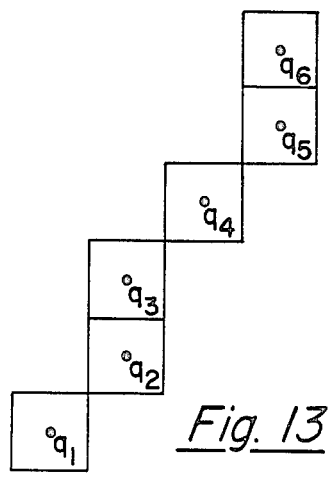
FIG. 13 shows an arc with a depth greater than one.

Low level smoothing (LLS) is the routine depicted by line 88 and steps $o_1$ to $o_3$. FIGS. 12, 13 and 14 show LLS in graphic form. LLS smooths out arcs generated solely by discretization resulting from from the digitization process of an edge (as opposed to arcs which depict a shape feature). In FIG. 12, the arc formed by points $p_1$, $p_2$ and $p_3$ is the result of discretization of a shape's straight edge. The depth of arc $p_1$–$p_3$ is defined in a meaningful way. One useful definition is given in local descriptor $L_4$, below.

Using the above definition of depth, if the depth d is less than 1, then LLS would be involved. LLS will merge adjacent arcs, i.e. arcs with a boundary point as a common end point, with a depth less than the threshold depth into one arc. In FIG. 13, arcs $q_1$ to $q_4$ and $q_4$ to $q_6$ each have a depth less than 1, and are merged into one arc, $q_1$ to $q_6$. Only $q_1$ and $q_6$ would be examined as possible convex hull points (i.e. angle direction lines will be drawn to them) and points $q_2$ through $q_5$ would be excluded as potential convex hull points.

The arc $r_1$ to $r_7$ in FIG. 14 is an arc with (according to the above definition) a depth greater than 1. It would not be merged with adjacent arcs even if the adjacent arcs had a depth less than 1.

The optional subroutine of calculating shape descriptors is shown as inserted by line 90 in FIG. 11. It allows the determination of selected additional features for each arc. The twenty shape descriptors (global and local) listed below are useful for various artificial intelligent purposes, but one could use others or additional shape descriptors as desired.

A. Global Shape Descriptors

1. $f_1$ = object pixel area = number of non- zero (gray scale) pixels contained in the object.

2. $f_2$ = object perimeter =

$$\sum_{i=1}^{n-1} \text{distance}(V_i, V_{i+1});$$

n object vertices = $V_i$; distance = $(x_i - x_{i+1})^2 + (Y_i - Y_{i+1})^{\frac{1}{2}}$.

3. $f_3$ = convex area = sum of areas of triangle substended by $C_1$ and $C_i$, $C_{i+1}$; $2 \leq i \leq m-1$; m convex hull vertices = $C_j$.

4. $f_4$ = convex perimeter =

$$\sum_{i=1}^{m-1} \text{distance}(C_i, C_{i+1})$$

5. $f_5$ = convex hull fill ratio = $f_1/f_3$
6. $f_6$ = perimeter ratio = $f_2/f_4$
7. $f_7$ = relative subframe coordinates = coordinates of the minimum bounding rectangle (MBR) of the object relative to the coordinate system.
8. $f_8$ = object heights = maximum y − minimum y
9. $f_9$ = object width = maximum x − minimum x
10. $f_{10}$ = heighth/width = $f_8/f_9$
11. $f_{11}$ = corner angles = a corner angle $\theta$ for each boundary vertex $V_i$. K = a selected portion of the object length (i.e. number of boundary points) used to compute the vector sum of unit vectors $V_{xi}$ and $V_{yi}$ over K, i.e., $$V_x = \sum_{j=1}^{k} x_{i-j}, V_y = \sum_{j=1}^{k} x_{i+j}$$

with $V_i$ laying within K.

The angle $\theta_i$ is the angle subtended by $V_x$ and $V_y$ (see FIG. 14).

B. Local Descriptors

1. $L_1$ = convexity or concavity: 1 convex arc, 0 concave arc.
2. $L_2$ = Arc area.
3. $L_3$ = Arc length in pixels =

$$\sum_{i=k}^{l} \text{distance}(v_i, V_{i+1})$$

K = arc start point 1 = arc endpoint

4. $L_4$ = normalized arc depth = arc depth/object depth

Definitions of arc depth and object depth are given in "Measuring Concavity on a Rectangular Mosiac", J. Sklansky, IEEE Transactions on Computers, Vol. C-21, Dec. 1972, the same being incorporated herein by reference 5. $L_5$ = normalized arc length = $L_3/f_2$
6. $L_6$ = Corner angles = $f_{11}$ = set of $\theta_i$
7. $L_7$ = Curvature =

$$\frac{1}{n} \sum_{i=1}^{h} \theta_i.$$

8. $L_8$ = Straightness = Standard Deviation of $\theta_i$, $1 \leq i \leq n$.
9. $L_9$ = Normalized arc area = $L_2/f_1$.

It is useful to relate FIG. 11 to FIG. 1. The boundary point minimizer 42 can be implemented by programming general purpose computer 36 with the routine including steps $b_1$ to $b_4$. Arc detection logic 44 can similarly be a program including steps c through p (and steps $o_1$ to $o_3$ if desired). Arc feature extractor 46 corresponds to the step depicted as $o_4$. Iteration decision logic 48 is depicted as step q in FIG. 11. Boundary recording processor 40 corresponds to step b in FIG. 11 and video digitizer system 22 corresponds to step a in FIG. 11.

FIG. 16 is a detailed flow chart useful in generating a source code program for performing steps c through m of FIG. 11 (i.e. generation of the convex hull points). The optional routines are not included in FIG. 16. The inputs to the flow chart of FIG. 16 are a list of boundary vertices or points, and the number of vertices in the list. The output is a list of the boundary vertices which lie on the convex hull (i.e. the "pointers" to the convex hull points). It is assumed in FIG. 16 that the boundary points are clockwise ordered and are bounded by the two-dimensional space addressable by the image buffer 26 (of course a different ordering could be used for a different flow chart). All calculations used in the convex hull procedure of FIG. 16 assume a raster scan display memory which possesses an inverted y axis relative to standard Cartesian coordinates. Further the input vertex list is assumed to lie in quadrant 1 of the Cartesian coordintae system. Definitions employed are:

outside x = Maximum X coordinate of the image buffer + 1000.

outside y = Maximum Y coordinate of the image buffer + 1000.

prevangle = 0.0
remainder = v length

| hull x = outside x | Defines the zeroth convex hull point outside the domain of the inut vertex list. |
|---|---|
| hull y = outside y | | origin = 1, Pointer to the current origin.

c length = 0, number of convex hull points detected.

In FIG. 16, step 92, minang = 32000.0, selects a large initial angle value which is arbitrarily large so that the proper minimum angle can be determined by the procedure. Steps 94 through 98 adjust the angles between the direction lines and the reference line so that they are all between 0 and $\pi/2$.

Figure 17:
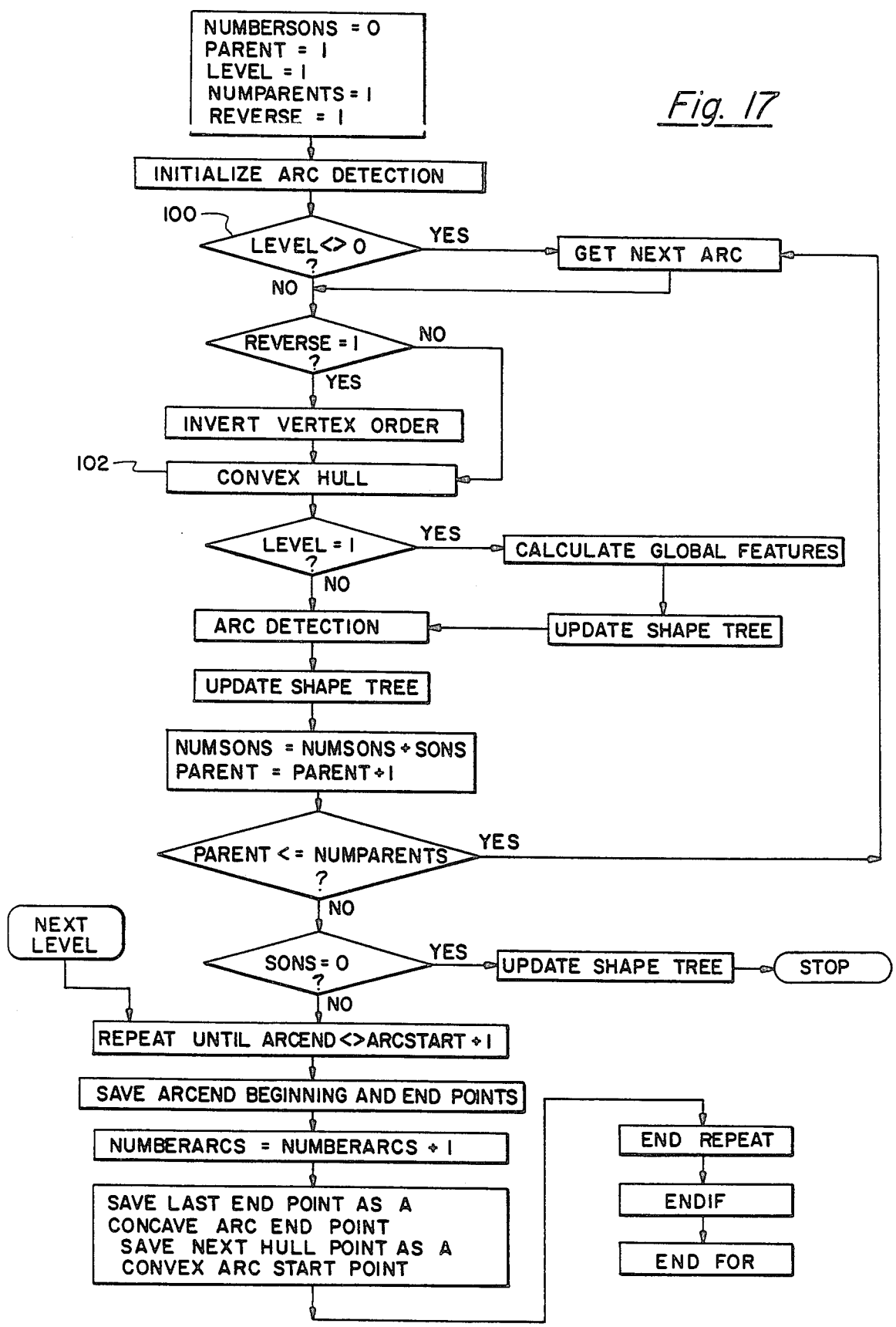
FIG. 17 is an example of a detailed flow chart for ac decomposition.

FIG. 17 is a detailed flow chart useful in generating source code programs for performing steps n through q of FIG. 11 (including step $o_4$ if desired).

In FIG. 17, step 100 says that if the level is not equal to 1, then the next arc to be processed will be pulled from the shape tree. If the level is 1, than the order of points is inverted and the convex hull procedure (e.g. the FIG. 16 flow chart) is performed as step 102. Step 104 is the optional calculation of shape descriptors. Step 106 is the correspondence test (step 52 of FIG. 3). The inputs to step 106 are the current arc vertices and the convex hull pointers within the current arc. The result or output of the part of FIG. 16 beginning with step 106 is found, in part, at each of steps 108 and 110. The output is the number of subarcs detected, a list of the locations of each dttected subarc and a list of local features for each detected subrac.

LLS routine steps $o_1$ to $o_3$ is not shown in FIG. 17, but it is strongly recommended that it be used with HBD, particularly when the method of the invention is applied to a digital raster scan device.

Appendix A attached hereto and incorporated herein, is an assembly code listing for the Honeywell Level 6/53 minicomputer. The listing contains two subroutines which are separately described in Appendix A by comments in the listing. The CVHULL subroutine performs the algorithm of FIGS. 16A and 16B. The BLDTRE subroutine performs the algorithm of FIG. 17, excluding calculation of shape descriptors but including LLS. Together they perform steps (c) through (q) in FIGS. 11a and 11b (i.e. the listing is for breadth first mode), including steps $0_1$ to $0_3$.

Figure 18:
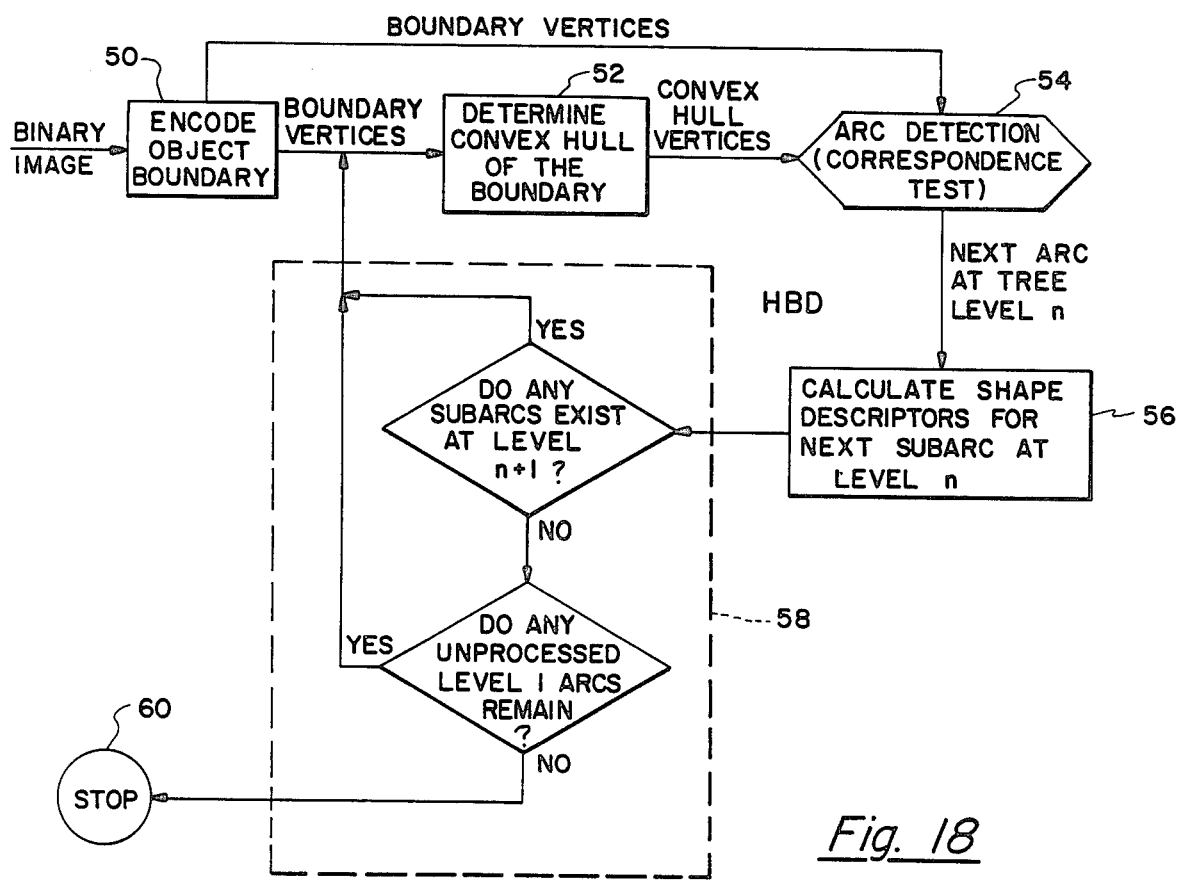
FIG. 18 is a high level flow chart of HBD in a "depth first" mode.

FIG. 18 corresponds to FIG. 3 but shows a "depth first" application of HBD. Corresponding steps in FIGS. 3 and 18 are like-numbered.

Figure 19:
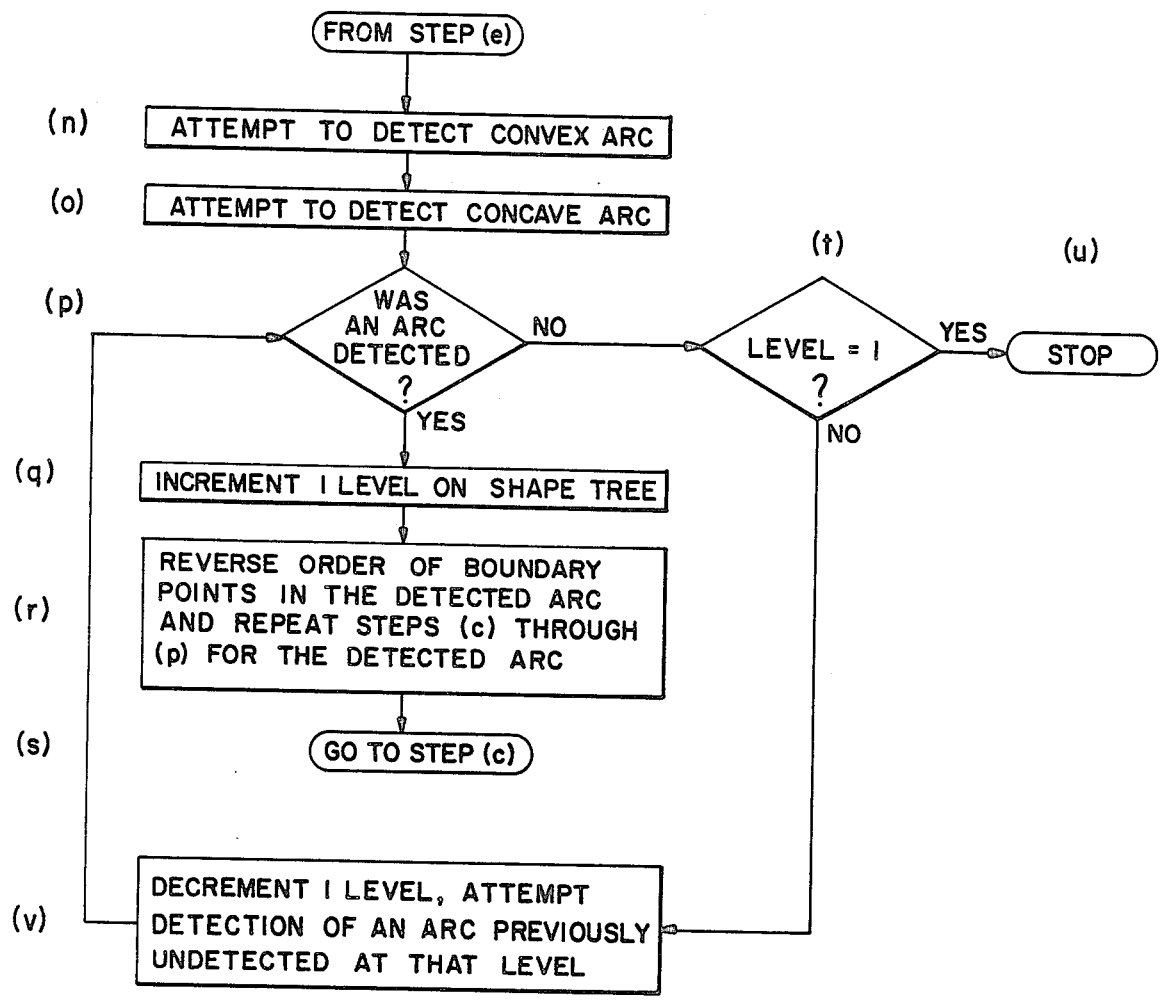
FIGS. 19 is an expanded flow chart of the method of FIG. 18, which substitutes selected steps for certain steps of FIGS. 11a and 11b.

FIG. 19 corresponds to part of FIG. 11a and FIG. 11b, but is modified to show a depth first application of HBD. Steps (a) through (l) in FIG. 19 are the same as steps (a) through (l) in FIG. 11a.

The present invention has been described primarily in the digital domain, however, continuous line representations of the boundary can also be processed by the present invention The boundary must however be separated into a series of points.

APPENDIX A

```
0000                        ORG    <$FCOMW
0000   0000                 DC     Z'0000'
0001   0000                 DC     Z'0000'
0002   0000                 DC     Z'0000'
0003   0000                 DC     Z'0000'
0004   4356                 DC     Z'4356'
0005   8855                 DC     Z'8855'
0006   4C4C                 DC     Z'4C4C'
0007   0000  0000           DC     <$PCOM

0000                        ORG    Z'0000'
1  -   -SUBROUTINE -CVHULL(VERTSX,VERTSY,VLENTH,OUTSDX,OUTSDY,CHULL,
2      +                   CLENTH,TOLRNC,STATUS)
   0000   OF80  0000  0000  STB    $85,<$FCOMW
   0003   9880  0000  0000  LAB    $81,<$FCOMW
   0006   D380  0000  0000  LNJ    $85,<Z1FPRE
   0009   89F7               CMZ    +$87
   000A   9CF7               LDB    $B1,+$B7
   000B   9F80  0000  0016  STB    $B1,<LSTEMP+22    T#11
   000E   9BC1  FFFF         LAB    $B1,$B1,65535
   0010   9F80  0000  0000  STB    $B1,<LSTEMP       T#0
   0013   9CF7               LDB    $B1,+$B7
   0014   9F80  0000  0014  STB    $B1,<LSTEMP+20    T#10
   0017   9BC1  FFFF         LAB    $B1,$B1,65535
   0019   9F80  0000  0002  STB    $B1,<LSTEMP+2     T#1
   001C   9CF7               LDB    $B1,+$B7
   001D   9F80  0000  0012  STB    $B1,<LSTEMP+18    T#9
   0020   9CF7               LDB    $B1,+$B7
   0021   9F80  0000  0010  STB    $B1,<LSTEMP+16    T#8
   0024   9CF7               LDB    $B1,+$B7
   0025   9F80  0000  000E  STB    $B1,<LSTEMP+14    T#7
   0028   9CF7               LDB    $B1,+$B7
   0029   9F80  0000  000C  STB    $B1,<LSTEMP+12    T#6
   002C   9BC1  FFFF         LAB    $B1,$B1,65535
   002E   9F80  0000  0004  STB    $B1,<LSTEMP+4     T#2
   0031   9CF7               LDB    $B1,+$B7
   0032   9F80  0000  000A  STB    $B1,<LSTEMP+10    T#5
   0035   9CF7               LDB    $B1,+$B7
   0036   9F80  0000  0008  STB    $B1,<LSTFMP+8     T#4
   0039   9CF7               LDB    $B1,+$B7
   003A   9F80  0000  0006  STB    $B1,<LSTEMP+6     T#3
3  *
4        IMPLICIT INTEGER*2 (A-Z)
5        INTEGER*2 VERTSX(1),VERTSY(1),VLENTH,CHULL(1),CLENTH,STATUS
6     +,OUTSDX,OUTSDY
7        REAL MINANG,SLUPE,ANGLE,DELTAX,DELTAY,TWOPI,PI,PREVANGLE,ANGLED1
8     +,RELANGLE,SAVE-ANGLE,HALFPI,TOLRNC
9  *++========================================================
10 *=========================================================
11 * ████████████████████████████████████████████████████████
12 *=========================================================
```

```
13 *$$  CVHULL:  CVHULL COMPUTES THE CONVEX HULL OF AN ORDERED SET
14 *$$           OF VERTICES.
15 *
16 *
17 *      MODIFIED BY SAME
18 *
19 *$$
20 *$$     CALL CVHULL(VERTSX,VERTSY,VLENTH,OUTSDX,OUTSDY,CHULL,
21 *$$    +            CLENTH,TOLRNC,STATUS)
22 *
23 * VARIABLE   TYPE   I/O   DESCRIPTION
24 * VERTSX     I*2    IN    X COORDINATES OF THE VERTICES.
25 * VERTSY     I*2    IN    Y COORDINATES OF THE VERTICES.
26 * VLENTH     I*2    IN    THE NUMBER OF VERTICES.
27 * OUTSDX     I*2    IN    POINT WHICH LIES "OUTSIDE" THE SET OF
28 * OUTSDY     I*2    IN    VERTICES.  BOTH OUTSDX AND OUTSDY MUST BE POSIT
29 * CHULL      I*2    OUT   ARRAY CONTAINING POINTERS TO CONVEX HULL VERTIC
30 * CLENTH     I*2    OUT   LENGTH OF CHULL
31 * TOLRNC     REL    IN    ANGULAR TOLERANCE OR QUANTIZATION IN DEGREES
32 * STATUS     I*2    OUT   STATUS=0 IF OPERATION COMPLETED SUCCESSFULLY.
33 *
34 * FUNCTIONAL DESCRIPTION:
35 *   - CVHULL IMPLEMENTS THE JARVIS 2 DIMENSIONAL CONVEX HULL ALGORITHM
36 *   THE ALGORITHM'S COMPUTATION TIME HAS BEEN REDUCED SIGNIFICANTLY BY
37 *   ASSUMING THAT THE INPUT SET OF VERTICES ARE ORDERED IN A SPATIAL
38 *   SENSE.  CVHULL WAS WRITTEN SPECIFICALLY FOR FINDING CONVEX HULLS OF
39 *   CHAINCODE BOUNDARIES.  CVHULL ASSUMES THE LISTS OF VERTICES
40 *   (VERTSX, VERTSY) TRAVERSE THE OBJECT BOUNDARY IN A CLOCKWISE
41 *   DIRECTION. - THIS MODUS OPERANDI IS CONSISTENT WITH SUCH BOUNDARY
42 *   EXTRACTION ROUTINES AS BORDR.
43 *      THE ALGORITHM REQUIRES 1 POINT (OUTSDX,OUTSDY) WHICH LIES
44 *   "OUTSIDE" THE GIVEN SET OF VERTICES.  THIS "OUTSIDE" POINT IS USED
45 *   TO FIND THE FIRST POINT ON THE CONVEX HULL.  TOLRNC IS A DEGREE OF
46 *   QUANTIZATION USED IN THE MEASURE OF THE SMALLEST ANGLE RELATIVE
47 *   TO THE CURRENT ORIGIN.  THAT IS, ANGLES WITHIN TOLRNC DEGREES
48 *   OF EACH OTHER ARE CONSIDERED EQUAL.  THIS DEVICE IS USED TO HANDLE
49 *   POINTS WHICH ARE "NEARLY" COLINEAR.
50 *==============================================================
51 *

003D   6C00                    LDV    $R6,0
    003E   EF08 0000 0006          STR    $R6,*<LSTEMP+6        STATUS

0041   E908 0000 0010          CMR    $R6,*<LSTEMP+16       OUTSDX
    0044   0881 0000               BAGE   M2
    0046   E908 0000 000E          CMR    $R6,*<LSTEMP+14       OUTSDY
    0049   0801 0000               BAL    5
    004B                    M2     EQU    $

004B   FB80 0000 0032          LAB    $B7,<$FCOMW+50
    004E   D380 0000 0000          LNJ    $B5,<EROUT
    0051   BC80 0000 0007          LDB    $B3,<$FCOMW+7

0054   0F81 0000               B      900

0056             5      EQU    $
    0056   E808 0000 0012          LDR    $R6,*<LSTEMP+18       VLENTH
    0059   6D00                    CMV    $R6,0
    005A   0A01 0000               BAG    6
    005C   FB80 0000 003D          LAB    $B7,<$FCOMW+61
    005F   D380 0000 0000          LNJ    $B5,<EROUT
    0062   BC80 0000 0007          LDB    $B3,<$FCOMW+7

0065   0F81 FFEF               B      900

0067             6      EQU    $ 0067   6C00                    LDV    $R6,0
    0068   EF08 0000 000A          STR    $R6,*<LSTEMP+10       CLENTH
```

```
0068  5C01                    LDV     $R5,1
006C  0F00 0000 000D          STR     $R5,<$FCOMW+13      ORIGIN 006F  98C0 0000               SLD     $S1,PC#0
0071  9D00 0000 000E          SST     $S1,<$FCOMW+14      PI

0074  A8C0 0000               SLD     $S2,PC#1
0076  AD00 0000 0010          SST     $S2,<$FCOMW+16      TWOPI 0079  98C0 0000               SLD     $S1,PC#2
007B  9D00 0000 0012          SST     $S1,<$FCOMW+18      HALFPI 007E  0F00 0000 0014          STR     $R5,<$FCOMW+20      INDEX
0081  0808 0000 0012          LDR     $R5,*<L$TEMP+18     VLENTH
0084  0200 0000 0014          SUB     $R5,<$FCOMW+20      INDEX
0087  5801 0000               BLZ     $R5,M6
0089  2C01                    LDV     $R2,1
008A                   M7     EQU     $

008A  E828 0000 0002          LDR     $R6,*<L$TEMP+2,$R2  VERTSY
008D  E270 0201               SUB     $R6,#513
008F  8256                    NEG     *$R6
0090  EF28 0000 0002          STR     $R6,*<L$TEMP+2,$R2  VERTSY 0093  2E01                    ADV     $R2,1
0094  8A80 0000 0014          INC     <$FCOMW+20          INDEX
0097  5773                    BDEC    $R5,>M7
0098                   M6     EQU     $ 0098  98C0 FFD7               SLD     $S1,PC#0
009A  9C08 0000 0008          SML     $S1,*<L$TEMP+8      TOLRNC
009D  DC40 0000               SDV     $S1,PC#3
009F  9D08 0000 0008          SST     $S1,*<L$TEMP+8      TOLRNC

00A2  A8C0 0000               SLD     $S2,PC#4
00A4  AD00 0000 0015          SST     $S2,<$FCOMW+21      PREVANGLE

00A7  E808 0000 0012          LDR     $R6,*<L$TEMP+18     VLENTH
00AA  EF00 0000 0017          STR     $R6,<$FCOMW+23      REMAINDER

00AD  0808 0000 000E          LDR     $R5,*<L$TEMP+14     OUTSDY
00B0  0F00 0000 0018          STR     $R5,<$FCOMW+24      HULLY

00B3  C808 0000 0010          LDR     $R4,*<L$TEMP+16     OUTSDX
00B6  CF00 0000 0019          STR     $R4,<$FCOMW+25      HULLX

00B9                   10     EQU     $

00B9  98C0 0000               SLD     $S1,PC#5
00BB  9D00 0000 001A          SST     $S1,<$FCOMW+26      MINANG

00BE  6C01                    LDV     $R6,1
00BF  EF00 0000 001C          STR     $R6,<$FCOMW+28      K
00C2  E800 0000 0017          LDR     $R6,<$FCOMW+23      REMAINDER
00C5  E200 0000 001C          SUB     $R6,<$FCOMW+28      K
00C8  6801 0000               BLZ     $R6,M16
00CA  EF00 0000 0018          STR     $R6,<L$TEMP+24      T#12
00CD  6C01                    LDV     $R6,1
00CE  EA08 0000 0012          ADD     $R6,*<L$TEMP+18     VLENTH
00D1  6EFF                    ADV     $R6,-1
00D2  EF00 0000 0019          STR     $R6,<L$TEMP+25      T#13
00D5  5CFF                    LDV     $R5,-1
00D6  0A00 0000 000D          ADD     $R5,<$FCOMW+13      ORIGIN
00D9  0F00 0000 001A          STR     $R5,<L$TEMP+26      T#14
00DC                   M17    EQU     $
```

```
00DC  E800 0000 001A        LDR    SR6,<LSTEMP+26      T#14
00DF  EF00 0000 001D        STR    SR6,<SFCOMW+29      COUNTER

00E2  6D01                  CMV    SR6,1
00E3  0881 0000             BAGE   M8
00E5  D800 0000 0019        LDR    SR5,<LSTEMP+25      T#13
00E8  DF00 0000 001D        STR    SR5,<SFCOMW+29      COUNTER
00EB                  M8    EQU    S

00EB  9800 0000 001D        LDR    SR1,<SFCOMW+29      COUNTER
00EE  E818 0000 0000        LDR    SR6,@<LSTEMP,SR1    VERTSX
00F1  E200 0000 0019        SUB    SR6,<SFCOMW+25      HULLX
00F4  98D6                  SLD    SS1,=SR6
00F5  9D00 0000 001E        SST    SS1,<SFCOMW+30      DELTAX

00F8  D818 0000 0002        LDR    SR5,@<LSTEMP+2,SR1  VERTSY
00FB  D200 0000 0018        SUB    SR5,<SFCOMW+24      HULLY
00FE  98D5                  SLD    SS1,=SR5
00FF  9D00 0000 0020        SST    SS1,<SFCOMW+32      DELTAY

0102  A880 0000 001E        SLD    SS2,<SFCOMW+30      DELTAX
0105  E8C0 FF9D             SCM    SS2,PC#4
0107  4581 0000             SBNE   20

0109  D8C0 FFFC             SCM    SS1,PC#4
010B  4601 0000             SBG    M21

010D  98C0 0000             SLD    SS1,PC#6
010F  9D00 0000 0022        SST    SS1,<SFCOMW+34      SLOPE 0112  0F81 0000             B      25

0114  0F81 0000             B      M20
0116                  M21   EQU    S 0116  98C0 FFA3             SLD    SS1,PC#5
0118  9D00 0000 0022        SST    SS1,<SFCOMW+34      SLOPE 011B  0F81 FFF7             B      25

011D                  M20   EQU    S 011D                  20    EQU    S
011D  9880 0000 0020        SLD    SS1,<SFCOMW+32      DELTAY
0120  DC00 0000 001E        SDV    SS1,<SFCOMW+30      DELTAX
0123  9D00 0000 0022        SST    SS1,<SFCOMW+34      SLOPE 0126                  25    EQU    S
0126  F880 0000 0044        LAB    SB7,<SFCOMW+68
0129  D380 0000 0000        LNJ    SB5,<Z1FAT6
012C  9D00 0000 0024        SST    SS1,<SFCOMW+36      ANGLE

012F  A880 0000 001E        SLD    SS2,<SFCOMW+30      DELTAX
0132  E8C0 FFD7             SCM    SS2,PC#4
0134  4481 0000             SBGE   M24

0136  9980 0000 000E        SAD    SS1,<SFCOMW+14      PI
```

```
0139  9D00 0000 0024         SST    $S1,<$FCOMW+36    ANGLE
       ████████████████████████████████
013C  0F81 0000               B      M23
013E                    M24   EQU    $
013E  9880 0000 0020          SLD    $S1,<$FCOMW+32    DELTAY
0141  D8C0 FFF1               SCM    $S1,PC#4
0143  4481 0000               SBGE   M26
       ████████████████████████
0145  A880 0000 0024          SLD    $S2,<$FCOMW+36    ANGLE
0148  A980 0000 0010          SAD    $S2,<$FCOMW+16    TWOPI
014B  AD00 0000 0024          SST    $S2,<$FCOMW+36    ANGLE

014E                    M26   EQU    $
014E                    M23   EQU    $ 014E  9880 0000 001E          SLD    $S1,<$FCOMW+30    DELTAX
0151  D8C0 FFF0               SCM    $S1,PC#4
0153  4581 0000               SBNE   M28
0155  A880 0000 0020          SLD    $S2,<$FCOMW+32    DELTAY
0158  E8C0 FFF9               SCM    $S2,PC#4
015A  4501 0000               SBE    50
015C                    M28   EQU    $ 015C  9880 0000 0024          SLD    $S1,<$FCOMW+36    ANGLE
015F  9D00 0000 0026          SST    $S1,<$FCOMW+38    RELANGLE

0162  D880 0000 0015          SCM    $S1,<$FCOMW+21    PREVANGLE
0165  4481 0000               SBGE   M11
0167  9980 0000 0010          SAD    $S1,<$FCOMW+16    TWOPI
016A  9D00 0000 0026          SST    $S1,<$FCOMW+38    RELANGLE
016D                    M11   EQU    $ 016D  9880 0000 0026          SLD    $S1,<$FCOMW+38    RELANGLE
0170  D980 0000 0015          SSB    $S1,<$FCOMW+21    PREVANGLE
0173  9980 0000 0012          SAD    $S1,<$FCOMW+18    HALFPI
0176  9D00 0000 0028          SST    $S1,<$FCOMW+40    ANGLEDIF

0179  D880 0000 0010          SCM    $S1,<$FCOMW+16    TWOPI
017C  4681 0000               SBLE   M12
017E  D980 0000 0010          SSB    $S1,<$FCOMW+16    TWOPI
0181  9D00 0000 0028          SST    $S1,<$FCOMW+40    ANGLEDIF
0184                    M12   EQU    $ 0184  9880 0000 0028          SLD    $S1,<$FCOMW+40    ANGLEDIF
0187  D980 0000 001A          SSB    $S1,<$FCOMW+26    MINANG
018A  D888 0000 0008          SCM    $S1,*<LSTEMP+8    TOLRNC
018D  4601 FFCD               SBG    50

018F  A880 0000 0028          SLD    $S2,<$FCOMW+40    ANGLEDIF
0192  AD00 0000 001A          SST    $S2,<$FCOMW+26    MINANG 0195  9880 0000 0024          SLD    $S1,<$FCOMW+36    ANGLE
0198  9D00 0000 002A          SST    $S1,<$FCOMW+42    SAVE-ANGL

019B  E800 0000 0010          LDR    $R6,<$FCOMW+29    COUNTER
019E  EF00 0000 002C          STR    $R6,<$FCOMW+44    NEXT-ORIG
```

```
01A1                         50      EQU   S
01A1   8880 0000 0019                DEC   <LSTEMP+25        T#13
01A4   8880 0000 001A                DEC   <LSTEMP+26        T#14
01A7   8A80 0000 001C                INC   <SFCOMW+28        K
01AA   8880 0000 0018                DEC   <LSTEMP+24        T#12
01AD   0601 FF2E                     BCT   M17
01AF                         M16     EQU   S

01AF   6C01                          LDV   SR6,1
01B0   EF00 0000 002D                STR   SR6,<SFCOMW+45    L
01B3   D808 0000 000A                LDR   SR5,*<LSTEMP+10   CLENTH
01B6   D200 0000 002D                SUB   SR5,<SFCOMW+45    L
01B9   5801 0000                     BLZ   SR5,M33
01BB   A856                          LDR   SR2,=SR6
01BC                         M34     EQU   S

01BC   E828 0000 0004                LDR   SR6,*<LSTEMP+4,SR2  CHULL
01BF   E900 0000 002C                CMR   SR6,<SFCOMW+44      NEXT-ORIG
01C2   0901 0000                     BE    200

01C4   2E01                          ADV   SR2,1
01C5   8A80 0000 002D                INC   <SFCOMW+45        L
01C8   5774                          BDEC  SR5,>M34
01C9                         M33     EQU   S

01C9   8A88 0000 000A                INC   *<LSTEMP+10       CLENTH

01CC   E808 0000 000A                LDR   SR6,*<LSTEMP+10   CLENTH
01CF   E908 0000 0012                CMR   SR6,*<LSTEMP+18   VLENTH
01D2   0A81 0000                     BALE  70

01D4   FB80 0000 004B                LAB   SR7,<SFCOMW+75
01D7   D380 0000 0000                LNJ   SR5,<EROUT
01DA   BC80 0000 0007                LDR   SR3,<SFCOMW+7

01DD   FB80 0000 0056                LAB   SR7,<SFCOMW+86
01E0   D380 0000 0000                LNJ   SR5,<EROUT
01E3   BC80 0000 0007                LDB   SR3,<SFCOMW+7

01E6   0F81 FE7F                     B     900

01E8                         70      EQU   S
01E8   9808 0000 000A                LDR   SR1,*<LSTEMP+10   CLENTH
01EB   E800 0000 002C                LDR   SR6,<SFCOMW+44    NEXT-ORIG
01EE   EF18 0000 0004                STR   SR6,*<LSTEMP+4,SR1  CHULL

01F1   A856                          LDR   SR2,=SR6
01F2   0828 0000 0000                LDR   SR5,*<LSTEMP,SR2  VERTSX
01F5   DF00 0000 0019                STR   SR5,<SFCOMW+25    HULLX

01F8   C828 0000 0002                LDR   SR4,*<LSTEMP+2,SR2  VERTSY
01FB   CF00 0000 0018                STR   SR4,<SFCOMW+24    HULLY

01FE   AF00 0000 000D                STR   SR2,<SFCOMW+13    ORIGIN 0201   9880 0000 002A                SLD   SS1,<SFCOMW+42    SAVE-ANGL
0204   9000 0000 0015                SST   SS1,<SFCOMW+21    PREVANGLE 0207   1D01                          CMV   SR1,1
```

```
0208  0981 0000              BNE    M39
0208  B808 0000 0012         LDR    SR3,*<LSTEMP+18      VLENTH
020D  BF00 0000 0017         STR    SR3,<SFCOMW+23       REMAINDER 0210  0F81 0000              B      M38
0212                  M39    EQU    $
0212  1CFF                   LDV    SR1,-1
0213  9A08 0000 000A         ADD    SR1,*<LSTEMP+10      CLENTH
0216  E818 0000 0004         LDR    SR6,*<LSTEMP+4,SR1   CHULL
0219  A808 0000 000A         LDR    SR2,*<LSTEMP+10      CLENTH
021C  E928 0000 0004         CMR    SR6,*<LSTEMP+4,SR2   CHULL
021F  0881 0000              BAGE   M41

0221  2EFF                   ADV    SR2,-1
0222  D828 0000 0004         LDR    SR5,*<LSTEMP+4,SR2   CHULL
0225  5EFF                   ADV    SR5,-1
0226  B808 0000 000A         LDR    SR3,*<LSTEMP+10      CLENTH
0229  C838 0000 0004         LDR    SR4,*<LSTEMP+4,SR3   CHULL
022C  C208 0000 0012         SUB    SR4,*<LSTEMP+18      VLENTH
022F  4EFF                   ADV    SR4,-1
0230  C255                   SUB    SR4,=SR5
0231  CA00 0000 0017         ADD    SR4,<SFCOMW+23       REMAINDER
0234  CF00 0000 0017         STR    SR4,<SFCOMW+23       REMAINDER 0237  0F81 FFD9              B      M38
0239                  M41    EQU    $
0239  1CFF                   LDV    SR1,-1
023A  9A08 0000 000A         ADD    SR1,*<LSTEMP+10      CLENTH
023D  E818 0000 0004         LDR    SR6,*<LSTEMP+4,SR1   CHULL
0240  A808 0000 000A         LDR    SR2,*<LSTEMP+10      CLENTH
0243  E228 0000 0004         SUB    SR6,*<LSTEMP+4,SR2   CHULL
0246  E200 0000 0017         SUB    SR6,<SFCOMW+23       REMAINDER
0249  8256                   NEG    =SR6
024A  EF00 0000 0017         STR    SR6,<SFCOMW+23       REMAINDER

024D                  M38    EQU    $

024D  E800 0000 0017         LDR    SR6,<SFCOMW+23       REMAINDER
0250  6D00                   CMV    SR6,0
0251  0A01 FE67              BAG    10

0253  FB80 0000 0061         LAB    SB7,<SFCOMW+97
0256  D390 0000 0000         LNJ    SB5,<EROUT
0259  BC80 0000 0007         LDB    SB3,<SFCOMW+7

025C  0F81 FF8A              B      900

025E                  200    EQU    $ 025E  6C01                   LDV    SR6,1
025F  EF00 0000 0014         STR    SR6,<SFCOMW+20       INDEX
0262  D808 0000 0012         LDR    SR5,*<LSTEMP+18      VLENTH
0265  D200 0000 0014         SUB    SR5,<SFCOMW+20       INDEX
0268  5801 0000              BLZ    SR5,M44
026A  A856                   LDR    SR2,=SR6
026B                  M45    EQU    $
026B  E828 0000 0002         LDR    SR6,*<LSTEMP+2,SR2   VERTSY
026E  E270 0201              SUB    SR6,=513
0270  8256                   NEG    =SR6
0271  EF28 0000 0002         STR    SR6,*<LSTEMP+2,SR2   VERTSY 0274  2E01                   ADV    SR2,1
0275  8A80 0000 0014         INC    <SFCOMW+20           INDEX
0278  5773                   BDEC   SR5,>M45
0279                  M44    EQU    $
```

```
0279  8388 0000 0000              JMP    *<SFCOMW 027C                        900   EQU    $ 027C  6CFF                        LDV    SR6,=1
027D  EF08 0000 0006              STR    SR6,*<LSTEMP+6      STATUS 0280  8388 0000 0000              JMP    *<SFCOMW
0283  8232                  PC00  DC     Z'8232'
0284  43F3                        DC     Z'43F3'
0285  8264                  PC01  DC     Z'8264'
0286  87E7                        DC     Z'87E7'
0287  8219                  PC02  DC     Z'8219'
0288  21F9                        DC     Z'21F9'
0289  8484                  PC03  DC     Z'8484'
028A  0000                        DC     Z'0000'
028B  0000                  PC04  DC     Z'0000'
028C  0000                        DC     Z'0000'
028D  887D                  PC05  DC     Z'887D'
028E  0000                        DC     Z'0000'
028F  897D                  PC06  DC     Z'897D'
0290  0000                        DC     Z'0000'

002E                              ORG    <SFCOMW+46
002E  0028                        DC     Z'0028'
002F  0000                        DC     Z'0000'
0030  0000 0068                   DC     <DC#0
0032  0007                        DC     Z'0007'
0033  0000 002E                   DC     <SFCOMW+46
0035  0000 007E                   DC     <DC#1
0037  0000 000C                   DC     <SFCOMW+12          STAT
0039  0026                        DC     Z'0026'
003A  0000                        DC     Z'0000'
003B  0000 007F                   DC     <DC#2
003D  0007                        DC     Z'0007'
003E  0000 0039                   DC     <SFCOMW+57
0040  0000 007E                   DC     <DC#1
0042  0000 000C                   DC     <SFCOMW+12          STAT
0044  0003                        DC     Z'0003'
0045  0000 0022                   DC     <SFCOMW+34          SLOPE
0047  002F                        DC     Z'002F'
0048  0000                        DC     Z'0000'
0049  0000 0092                   DC     <DC#3
004B  0007                        DC     Z'0007'
004C  0000 0047                   DC     <SFCOMW+71
004E  0000 007E                   DC     <DC#1
0050  0000 000C                   DC     <SFCOMW+12          STAT
0052  0019                        DC     Z'0019'
0053  0000                        DC     Z'0000'
0054  0000 00AA                   DC     <DC#4
0056  0007                        DC     Z'0007'
0057  0000 0052                   DC     <SFCOMW+82
0059  0000 007E                   DC     <DC#1
005B  0000 000C                   DC     <SFCOMW+12          STAT
005D  0019                        DC     Z'0019'
005E  0000                        DC     Z'0000'
005F  0000 00B7                   DC     <DC#5
0061  0007                        DC     Z'0007'
0062  0000 005D                   DC     <SFCOMW+93
0064  0000 007E                   DC     <DC#1
0066  0000 000C                   DC     <SFCOMW+12          STAT
0068  4356                  DC#0  DC     Z'4356'
0069  4855                        DC     Z'4855'
006A  8C4C                        DC     Z'8C4C'
006B  3A20                        DC     Z'3A20'
006C  4F55                        DC     Z'4F55'
006D  5453                        DC     Z'5453'
006E  4458                        DC     Z'4458'
006F  2061                        DC     Z'2061'
0070  6E64                        DC     Z'6E64'
0071  204F                        DC     Z'204F'
0072  5554                        DC     Z'5554'
0073  5384                        DC     Z'5384'
```

| | | | | |
|---|---|---|---|---|
| 0074 | 5920 | | DC | Z'5920' |
| 0075 | 6D75 | | DC | Z'6D75' |
| 0076 | 7374 | | DC | Z'7374' |
| 0077 | 2062 | | DC | Z'2062' |
| 0078 | 6520 | | DC | Z'6520' |
| 0079 | 706F | | DC | Z'706F' |
| 007A | 7369 | | DC | Z'7369' |
| 007B | 7469 | | DC | Z'7469' |
| 007C | 7665 | | DC | Z'7665' |
| 007D | 2E20 | | DC | Z'2E20' |
| 007E | 0000 | DC#1 | DC | Z'0000' |
| 007F | 4356 | DC#2 | DC | Z'4356' |
| 0080 | 4855 | | DC | Z'4855' |
| 0081 | 4C4C | | DC | Z'4C4C' |
| 0082 | 3A20 | | DC | Z'3A20' |
| 0083 | 4E75 | | DC | Z'4E75' |
| 0084 | 6D62 | | DC | Z'6D62' |
| 0085 | 6572 | | DC | Z'6572' |
| 0086 | 206F | | DC | Z'206F' |
| 0087 | 6620 | | DC | Z'6620' |
| 0088 | 7665 | | DC | Z'7665' |
| 0089 | 7274 | | DC | Z'7274' |
| 008A | 6963 | | DC | Z'6963' |
| 008B | 6573 | | DC | Z'6573' |
| 008C | 206D | | DC | Z'206D' |
| 008D | 7573 | | DC | Z'7573' |
| 008E | 7420 | | DC | Z'7420' |
| 008F | 6265 | | DC | Z'6265' |
| 0090 | 203E | | DC | Z'203E' |
| 0091 | 2030 | | DC | Z'2030' |
| 0092 | 4356 | DC#3 | DC | Z'4356' |
| 0093 | 4855 | | DC | Z'4855' |
| 0094 | 4C4C | | DC | Z'4C4C' |
| 0095 | 3A20 | | DC | Z'3A20' |
| 0096 | 2320 | | DC | Z'2320' |
| 0097 | 504F | | DC | Z'504F' |
| 0098 | 494E | | DC | Z'494E' |
| 0099 | 5453 | | DC | Z'5453' |
| 009A | 2049 | | DC | Z'2049' |
| 009B | 4E20 | | DC | Z'4E20' |
| 009C | 5448 | | DC | Z'5448' |
| 009D | 4520 | | DC | Z'4520' |
| 009E | 434F | | DC | Z'434F' |
| 009F | 4E56 | | DC | Z'4E56' |
| 00A0 | 4558 | | DC | Z'4558' |
| 00A1 | 2048 | | DC | Z'2048' |
| 00A2 | 554C | | DC | Z'554C' |
| 00A3 | 4C20 | | DC | Z'4C20' |
| 00A4 | 3E20 | | DC | Z'3E20' |
| 00A5 | 4C45 | | DC | Z'4C45' |
| 00A6 | 4E47 | | DC | Z'4E47' |
| 00A7 | 5448 | | DC | Z'5448' |
| 00A8 | 204F | | DC | Z'204F' |
| 00A9 | 4620 | | DC | Z'4620' |
| 00AA | 2020 | DC#4 | DC | Z'2020' |
| 00AB | 2020 | | DC | Z'2020' |
| 00AC | 2020 | | DC | Z'2020' |
| 00AD | 2020 | | DC | Z'2020' |
| 00AE | 434F | | DC | Z'434F' |
| 00AF | 4E56 | | DC | Z'4E56' |
| 00B0 | 4558 | | DC | Z'4558' |
| 00B1 | 2048 | | DC | Z'2048' |
| 00B2 | 554C | | DC | Z'554C' |
| 00B3 | 4C20 | | DC | Z'4C20' |
| 00B4 | 4152 | | DC | Z'4152' |
| 00B5 | 5241 | | DC | Z'5241' |
| 00B6 | 5920 | | DC | Z'5920' |
| 00B7 | 4356 | DC#5 | DC | Z'4356' |
| 00B8 | 4855 | | DC | Z'4855' |
| 00B9 | 4C4C | | DC | Z'4C4C' |
| 00BA | 3A20 | | DC | Z'3A20' |
| 00BB | 7265 | | DC | Z'7265' |
| 00BC | 6D61 | | DC | Z'6D61' |
| 00BD | 696E | | DC | Z'696E' |

```
00BE  6465                     DC    Z'6465'
00BF  7220                     DC    Z'7220'
00C0  6973                     DC    Z'6973'
00C1  203C                     DC    Z'203C'
00C2  3D20                     DC    Z'3D20'
00C3  3020                     DC    Z'3020'
00C4              LSTEMP       RESV  27

0291                           ORG   Z'0291'
0000                           ORG   <SFCOMM
0000  0000                     DC    Z'0000'
0001  0000                     DC    Z'0000'
0002  0000                     DC    Z'0000'
0003  0000                     DC    Z'0000'
0004  424C                     DC    Z'424C'
0005  4454                     DC    Z'4454'
0006  5245                     DC    Z'5245'
0007  0000 0000                DC    <SRCOM

0002                           ORG   Z'0002'
```
1     SUBROUTINE BLDTRE (LBLFN,RAREA,DESCR,FVLFN,FVPOS,WRKBUF,BUFLEN,
2    +                   OUTBUF,OUTLEN,MINPCT,XYWIN,LENPCT,NLEVELS,
3    +                   STATUS)
```
    0002  DF80 0000 0000       STB   SB5,<SFCOMM
    0005  9B80 0000 0000       LAB   SB1,<SFCOMM
    0008  D380 0000 0000       LNJ   SB5,<Z1FPRE
    000B  89F7                 CMZ   +SB7
    000C  9CF7                 LDB   SB1,+SB7
    000D  9F80 0000 0020       STB   SB1,<LSTEMP+32   T#16
    0010  9CF7                 LDB   SB1,+SB7
    0011  9F80 0000 001E       STB   SB1,<LSTEMP+30   T#15
    0014  9CF7                 LDB   SB1,+SB7
    0015  9F80 0000 001C       STB   SB1,<LSTEMP+28   T#14
    0018  98C1 FFFF            LAB   SB1,SB1,65535
    001A  9F80 0000 0002       STB   SB1,<LSTEMP+2    T#1
    001D  9CF7                 LDB   SB1,+SB7
    001E  9F80 0000 001A       STB   SB1,<LSTEMP+26   T#13
    0021  9CF7                 LDB   SB1,+SB7
    0022  9F80 0000 0018       STB   SB1,<LSTEMP+24   T#12
    0025  9CF7                 LDB   SB1,+SB7
    0026  9F80 0000 0016       STB   SB1,<LSTEMP+22   T#11
    0029  98C1 FFFF            LAB   SB1,SB1,65535
    002B  9F80 0000 0004       STB   SB1,<LSTEMP+4    T#2
    002E  9CF7                 LDB   SB1,+SB7
    002F  9F80 0000 0014       STB   SB1,<LSTEMP+20   T#10
    0032  9CF7                 LDB   SB1,+SB7
    0033  9F80 0000 0012       STB   SB1,<LSTEMP+18   T#9
    0036  98C1 FFFE            LAB   SB1,SB1,65534
    0038  9F80 0000 0000       STB   SB1,<LSTEMP      T#0
    003B  9CF7                 LDB   SB1,+SB7
    003C  9F80 0000 0010       STB   SB1,<LSTEMP+16   T#8
    003F  9CF7                 LDB   SB1,+SB7
    0040  9F80 0000 000E       STB   SB1,<LSTEMP+14   T#7
    0043  9CF7                 LDB   SB1,+SB7
    0044  9F80 0000 000C       STB   SB1,<LSTEMP+12   T#6
    0047  9CF7                 LDB   SB1,+SB7
    0048  9F80 0000 000A       STB   SB1,<LSTEMP+10   T#5
    004B  9CF7                 LDB   SB1,+SB7
    004C  9F80 0000 0008       STB   SB1,<LSTEMP+8    T#4
    004F  9CF7                 LDB   SB1,+SB7
    0050  9F80 0000 0006       STB   SB1,<LSTEMP+6    T#3
```
4    *
5    ----IMPLICIT INTEGER*2 (A-Z)
6        REAL OUTBUF(1),TOLRNC,CAREA,CPERIM,MINPCT,SMOOTH,REVERSE,RPERIM
7        REAL LENPCT
8        INTEGER*2 DESCR(1),WRKBUF(1)
9        INTEGER*4 RAREA
10       LOGICAL*2 FOUR
11       CHARACTER CHRSTAT*6
12   *
13   *++
14   *====================================================================
16   *====================================================================

```
17 *
18 *$$   BLDTRE     BUILDS A TREE OF SHAPE DESCRIPTORS.
19 *$$
20 *
22 *
23 *     SOURCE CODE    ADVANCED FORTRAN
24 *
25 *$$   CALL BLDTRE--(LBLFN,RAREA,DESCR,FVLFN,FVPOS,WRKBUF,BUFLEN,
26 *$$                OUTBUF,OUTLEN,MINPCT,XYWIN,LENPCT,NLEVELS,STATUS)
27 *
28 *
29 *     PARAMETERS
30 *
31 *     LBLFN      INT*2    INPUT     LFN OF LABELLED INPUT IMAGE
32 *     RAREA      INT*4    INPUT     REGION AREA
33 *     DESCR      INT*2    IN/OUT    DESCRIPTOR ARRAY (FOR RDSILH)
34 *                                   1    XBEGIN         INPUT
35 *                                   2    XEND           INPUT
36 *                                   3    YBEGIN         INPUT
37 *                                   4    YEND           INPUT
38 *                                   5    LABEL          INPUT
39 *     FVLFN      INT*2    INPUT     LFN OF SHAPE TREE FVF
40 *     FVPOS      INT*2    INPUT     CURRENT LAST WRITTEN RECORD OF FVLFN
41 *     WRKBUF     INT*2    INPUT     WORKING BUFFER, SIZE 2048+
42 *     BUFLEN     INT*2    INPUT     LENGTH OF WORKING BUFFER
43 *     OUTBUF     REAL     INPUT     FV FILE OUTPUT BUFFER
44 *     OUTLEN     INT*2    INPUT     LENGTH OF FV FILE BUFFER
45 *     MINPCT     REAL     INPUT     ARCS WITH PIXEL AREA < MINPCT ARE IG
46 *     XYWIN      INT*2    INPUT     WINDOW SIZE FOR XYCOOR
47 *     LENPCT     REAL     INPUT     PERIMETER %AGE FOR VTANGL
48 *     NLEVELS    INT*2    INPUT     #LEVELS DESIRED IN SHAPE TREE.
49 *     STATUS     INT*2    OUTPUT    RETURN STATUS, 0 = NO ERROR
50 *
51 *
52 *     FUNCTIONAL DESCRIPTION
53 *
54 *     THIS ROUTINE TAKES A REGION FROM THE LABELLED INPUT IMAGE AND
55 *     CREATES A FEATURE VECTOR FILE CONTAINING ITS PERTINENT SHAPE
56 *     DESCRIPTORS. THE CONVEX HULL OF THE REGION IS OBTAINED
57 *     USING THE CVHULL ROUTINE AND THE CONVEXITIES CHARACTERIZED USING
58 *     THE VT**** ROUTINES.
59 *
60 *
61 *
62 *     ROUTINES CALLED
63 *
64 *       (ARCFET)   BORDR    (CLRBFR)   CRFIL     (CVHULL)   EROUT
65 *        FVINFO    GTFIL     RDSILH    RDVECT     RMFIL     (UPDATE)
66 *       (VCTOUT)  (VTANGL)  (VTAREA)  (VTPMTR)   WRVECT    (XYCOOR)
67 *
68 *       ( ) IS GSD INSTALLED   *GSTOR1>UDD>GSD>GSD>SOURCE
69 *
70 *--
71 *
72 1   FORMAT (I6)
     0000                    1        EQU    $
     0000 2849                        DC     Z'2849'
     0001 3629                        DC     Z'3629'
73       CALL FVINFO (FVLFN,NFEAT,NVECT,FVSIZE,STATUS)
     0053 9B88 0000 001A             LAB    $B1,*<L$TEMP+26      FVLFN
     0056 9F80 0000 004F             STB    $B1,<$FCOMM+79
     0059 AB88 0000 0006             LAB    $B2,*<L$TEMP+6       STATUS
     005C 1C04                       LDV    $R1,4
     005D AF90 0000 004F             STB    $B2,<$FCOMM+79,$R1
     0060 FB80 0000 004E             LAB    $B7,<$FCOMM+78
     0063 D380 0000 0000             LNJ    $B5,<FVINFO
     0066 8C80 0000 0007             LDA    $B3,<$FCOMM+7
74 *
75 * =========================================
76 *     MAIN PROGRAM
77 * =========================================
78 *
```

```
0069  6C00                   LDV    SR6,0
006A  EF00 0000 000F         STR    SR6,<SFCOMW+15      TOTALSON 006D  9888 0000 0006         LAB    SB1,*<LSTEMP+6      STATUS
0070  1C02                   LDV    SR1,2
0071  9F90 0000 005E         STB    SB1,<SFCOMW+94,SR1
0074  FB80 0000 005D         LAB    SB7,<SFCOMW+93
0077  D380 0000 0000         LNJ    SB5,<CRFIL
007A  BC80 0000 0007         LDB    SB3,<SFCOMW+7

007D  6C00                   LDV    SR6,0
007E  EF00 0000 0010         STR    SR6,<SFCOMW+16      SILFN 0081  9888 0000 0006         LAB    SB1,*<LSTEMP+6      STATUS
0084  1C03                   LDV    SR1,3
0085  9F90 0000 0065         STB    SB1,<SFCOMW+101,SR1
0088  FB80 0000 0064         LAB    SB7,<SFCOMW+100
008B  D380 0000 0000         LNJ    SB5,<GTFIL
008E  BC80 0000 0007         LDB    SB3,<SFCOMW+7

0091  E808 0000 0006         LDR    SR6,*<LSTEMP+6      STATUS
0094  6D00                   CMV    SR6,0
0095  0901 0000              BE     M2

0097  FB80 0000 0071         LAB    SB7,<SFCOMW+113
009A  D380 0000 0000         LNJ    SB5,<EROUT
009D  BC80 0000 0007         LDB    SB3,<SFCOMW+7

00A0  0F81 0000              B      100

00A2                         M2     EQU    $

00A2  E840 0000              LDR    SR6,PC#0
00A4  EF00 0000 0012         STR    SR6,<SFCOMW+18      FOUR

00A7  9888 0000 0020         LAB    SB1,*<LSTEMP+32     LBLFN
00AA  9F80 0000 0079         STB    SB1,<SFCOMW+121
00AD  AB88 0000 001C         LAB    SB2,*<LSTEMP+28     DESCR
00B0  1C02                   LDV    SR1,2
00B1  AF90 0000 0079         STB    SB2,<SFCOMW+121,SR1
00B4  C888 0000 0016         LAB    SB4,*<LSTEMP+22     WRKBUF
00B7  2C04                   LDV    SR2,4
00B8  CFA0 0000 0079         STB    SB4,<SFCOMW+121,SR2
00BB  D888 0000 0014         LAB    SB5,*<LSTEMP+20     BUFLEN
00BE  3C05                   LDV    SR3,5
00BF  DF80 0000 0079         STB    SB5,<SFCOMW+121,SR3
00C2  E888 0000 0006         LAB    SB6,*<LSTEMP+6      STATUS
00C5  1C06                   LDV    SR1,6
00C6  EF90 0000 0079         STB    SB6,<SFCOMW+121,SR1
00C9  FB80 0000 0078         LAB    SB7,<SFCOMW+120
00CC  D380 0000 0000         LNJ    SB5,<BORDR
00CF  BC80 0000 0007         LDB    SB3,<SFCOMW+7

00D2  E808 0000 0006         LDR    SR6,*<LSTEMP+6      STATUS
00D5  6D00                   CMV    SR6,0
00D6  0901 0000              BE     M11

00D8  FB80 0000 008B         LAB    SB7,<SFCOMW+139
00DB  D380 0000 0000         LNJ    SB5,<EROUT
00DE  BC80 0000 0007         LDB    SB3,<SFCOMW+7

00E1  0F81 FF8F              B      100
```

```
00E3                         M11    EQU    $

00E3   FB80 0000 0092         LAB    $B7,<SFCOMW+146
00E6   1C00                   LDV    SR1,0
00E7   D380 0000 0000         LNJ    $B5,<Z1FRWD

00EA   6C00                   LDV    SR6,0
00EB   EF00 0000 0013         STR    SR6,<SFCOMW+19        NSTATS

00EE   9B88 0000 0016         LAB    $B1,*<LSTEMP+22       WRKBUF
00F1   1C03                   LDV    SR1,3
00F2   9F90 0000 0098         STB    $B1,<SFCOMW+152,SR1
00F5   A888 0000 0014         LAB    $B2,*<LSTEMP+20       BUFLEN
00F8   2C04                   LDV    SR2,4
00F9   AFA0 0000 0098         STR    $B2,<SFCOMW+152,SR2
00FC   C8A8 0000 0006         LAB    $B4,*<LSTEMP+6        STATUS
00FF   3C08                   LDV    SR3,8
0100   CF80 0000 0098         STB    $B4,<SFCOMW+152,SR3
0103   FB80 0000 0097         LAB    $B7,<SFCOMW+151
0106   D380 0000 0000         LNJ    $B5,<RDSILH
0109   BC80 0000 0007         LDB    $B3,<SFCOMW+7

010C   E808 0000 0006         LDR    SR6,*<LSTEMP+6        STATUS
010F   6D00                   CMV    SR6,0
0110   0901 0000              BE     M14

0112   FB80 0000 00AE         LAB    $B7,<SFCOMW+174
0115   D380 0000 0000         LNJ    $B5,<EROUT
0118   BC80 0000 0007         LDB    $B3,<SFCOMW+7

011B   0F81 FFC6              B      100

011D                         M14    EQU    $

011D   FB80 0000 00B5         LAB    $B7,<SFCOMW+181
0120   1C00                   LDV    SR1,0
0121   D380 0000 0000         LNJ    $B5,<Z1FCLS

0124   FB80 0000 00BA         LAB    $B7,<SFCOMW+186
0127   D380 0000 0000         LNJ    $B5,<RMFIL
012A   BC80 0000 0007         LDB    $B3,<SFCOMW+7

012D   6C01                   LDV    SR6,1
012E   EF00 0000 0018         STR    SR6,<SFCOMW+24        CHAIN

0131   EA00 0000 0016         ADD    SR6,<SFCOMW+22        CHAINLE!
0134   EF00 0000 0019         STR    SR6,<SFCOMW+25        XYLEN

0137   EF00 0000 001A         STR    SR6,<SFCOMW+26        XCOOR

013A   EA00 0000 0019         ADD    SR6,<SFCOMW+25        XYLEN
013D   EF00 0000 001B         STR    SR6,<SFCOMW+27        YCOOR 0140   1C01                   LDV    SR1,1
0141   9898 0000 0004         LAB    $B1,*<LSTEMP+4,SR1    WRKBUF
0144   9F80 0000 00C2         STB    $B1,<SFCOMW+194
0147   A800 0000 001A         LDR    SR2,<SFCOMW+26        XCOUR
014A   A8A8 0000 0004         LAB    $B2,*<LSTEMP+4,SR2    WRKBUF
014D   3C02                   LDV    SR3,2
014E   AF80 0000 00C2         STB    $B2,<SFCOMW+194,SR3
```

```
0151  9856                    LDR    SR1,=SR6
0152  C898 0000 0004          LAB    SR4,*<LSTEMP+4,SR1    WRKBUF
0155  1C03                    LDV    SR1,3
0156  CF90 0000 00C2          STB    SR4,<SFCOMW+194,SR1
0159  D888 0000 000C          LAB    SR5,*<LSTEMP+12       XYWIN
015C  1C08                    LDV    SR1,8
015D  DF90 0000 00C2          STB    SR5,<SFCOMW+194,SR1
0160  E888 0000 0006          LAB    SR6,*<LSTEMP+6        STATUS
0163  1C09                    LDV    SR1,9
0164  EF90 0000 00C2          STB    SR6,<SFCOMW+194,SR1
0167  F880 0000 00C1          LAB    SR7,<SFCOMW+193
016A  D380 0000 0000          LNJ    SR5,<XYCOOR
016D  BC80 0000 0007          LDB    SR3,<SFCOMW+7

0170  E808 0000 0006          LDR    SR6,*<LSTEMP+6        STATUS
0173  6D00                    CMV    SR6,0
0174  0901 0000               BE     M17

0176  F880 0000 00DA          LAB    SR7,<SFCOMW+218
0179  D380 0000 0000          LNJ    SR5,<EROUT
017C  BC80 0000 0007          LDB    SR3,<SFCOMW+7

017F  0F81 FF9C               B      100

0181                    M17   EQU    $

0181  E800 0000 001B          LDR    SR6,<SFCOMW+27        YCOOR
0184  EA00 0000 0019          ADD    SR6,<SFCOMW+25        XYLEN
0187  EF00 0000 001D          STR    SR6,<SFCOMW+29        ANGLES

018A  D800 0000 001C          LDR    SR5,<SFCOMW+28        NUMCOORDS
018D  98D5                    SLD    SS1,=SR5
018E  9C08 0000 000A          SML    SS1,*<LSTEMP+10       LENPCT
0191  DC40 0000               SDV    SS1,PC01
0193  9D56                    SST    SS1,=SR6
0194  EF00 0000 001E          STR    SR6,<SFCOMW+30        WINDOW

0197  F880 0000 00E1          LAB    SR7,<SFCOMW+225
019A  D380 0000 0000          LNJ    SR5,<Z1FMX0
019D  EF00 0000 001E          STR    SR6,<SFCOMW+30        WINDOW

01A0  9800 0000 001A          LDR    SR1,<SFCOMW+26        XCOOR
01A3  9898 0000 0004          LAB    SS1,*<LSTEMP+4,SR1    WRKBUF
01A6  9F80 0000 00E7          STB    SS1,<SFCOMW+231
01A9  A800 0000 001B          LDR    SR2,<SFCOMW+27        YCOOR
01AC  A8A8 0000 0004          LAB    SS2,*<LSTEMP+4,SR2    WRKBUF
01AF  3C01                    LDV    SR3,1
01B0  AFB0 0000 00E7          STB    SS2,<SFCOMW+231,SR3
01B3  9800 0000 001D          LDR    SR1,<SFCOMW+29        ANGLES
01B6  C898 0000 0004          LAB    SR4,*<LSTEMP+4,SR1    WRKBUF
01B9  1C02                    LDV    SR1,2
01BA  CF90 0000 00E7          STB    SR4,<SFCOMW+231,SR1
01BD  D888 0000 0006          LAB    SR5,*<LSTEMP+6        STATUS
01C0  1C05                    LDV    SR1,5
01C1  DF90 0000 00E7          STB    SR5,<SFCOMW+231,SR1
01C4  F880 0000 00E6          LAB    SR7,<SFCOMW+230
01C7  D380 0000 0000          LNJ    SR5,<VTANGL
01CA  BC80 0000 0007          LDB    SR3,<SFCOMW+7

01CD  E808 0000 0006          LDR    SR6,*<LSTEMP+6        STATUS
01D0  6D00                    CMV    SR6,0
01D1  0901 0000               BE     M20

01D3  F880 0000 00F7          LAB    SR7,<SFCOMW+247
01D6  D380 0000 0000          LNJ    SR5,<EROUT
01D9  BC80 0000 0007          LDB    SR3,<SFCOMW+7
```

```
01DC  0F81 FFA3                      B       100
01DE                         M20     EQU     $

01DE  E800 0000 0019                 LDR     $R6,<$FCOMW+25    XYLEN
01E1  EA00 0000 001D                 ADD     $R6,<$FCOMW+29    ANGLES
01E4  EF00 0000 001F                 STR     $R6,<$FCOMW+31    XTEMP

01E7  EA00 0000 001C                 ADD     $R6,<$FCOMW+28    NUMCOORD
01EA  EF00 0000 0020                 STR     $R6,<$FCOMW+32    YTEMP

01ED  5C03                           LDV     $R5,3
01EE  DB00 0000 0016                 MUL     $R5,<$FCOMW+22    CHAINLEN
01F1  C800 0000 001C                 LDR     $R4,<$FCOMW+28    NUMCOORD:
01F4  CA54                           ADD     $R4,=$R4
01F5  CF00 0000 0022                 STR     $R4,<L$TEMP+34    T#17
01F8  CA55                           ADD     $R4,=$R5
01F9  C908 0000 0014                 CMR     $R4,*<L$TEMP+20   BUFLEN
01FC  0A81 0000                      BALE    M23

01FE  F880 0000 0102                 LAB     $87,<$FCOMW+258
0201  D380 0000 0000                 LNJ     $85,<EROUT
0204  BC80 0000 0007                 LDB     $83,<$FCOMW+7

0207  98C0 FDF8                      LAB     $B1,1
0209  1C01                           LDV     $R1,1
020A  9F90 0000 010E                 STB     $B1,<$FCOMW+270,$R1
020D  F880 0000 010D                 LAB     $87,<$FCOMW+269
0210  9870 8000                      LDR     $R1,=32768
0212  2C01                           LDV     $R2,1
0213  D380 0000 0000                 LNJ     $85,<Z1FWIF
0216  6C03                           LDV     $R6,3
0217  E800 0000 0022                 MUL     $R6,<L$TEMP+34    T#17
021A  EA00 0000 0016                 ADD     $R6,<$FCOMW+22    CHAINLEN
021D  EF00 0000 0023                 STR     $R6,<L$TEMP+35    T#18
0220  9880 0000 0023                 LAB     $B1,<L$TEMP+35    T#18
0223  D380 0000 0000                 LNJ     $85,<Z1FISF
0226  D380 0000 0000                 LNJ     $85,<Z1FSTF

0229  F880 0000 0114                 LAB     $87,<$FCOMW+276
022C  D380 0000 0000                 LNJ     $85,<EROUT
022F  BC80 0000 0007                 LDB     $83,<$FCOMW+7

0232  6C01                           LDV     $R6,1
0233  EF08 0000 0006                 STR     $R6,*<L$TEMP+6    STATUS 0236  0F81 FFA6                      B       100

0238                         M23     EQU     $ 0238  6C00                           LDV     $R6,0
0239  EF00 0000 0024                 STR     $R6,<$FCOMW+36    SEQNUM

023C  EF00 0000 0025                 STR     $R6,<$FCOMW+37    NUMSONS 023F  5C01                           LDV     $R5,1
0240  DF00 0000 0026                 STR     $R5,<$FCOMW+38    PARENT

0243  DF00 0000 0027                 STR     $R5,<$FCOMW+39    LEVEL

0246  DF00 0000 0028                 STR     $R5,<$FCOMW+40    NUMPAREN

0249  C800 0000 001C                 LDR     $R4,<$FCOMW+28    NUMCOORD
024C  CF00 0000 0029                 STR     $R4,<$FCOMW+41    VERTSLEN
```

```
0024F  98C0 0000            SLD   SS1,PC#2
0251   9D00 0000 002A       SST   SS1,<SFCOMW+42      REVERSE

0254                    S   EQU   S
0254   8A80 0000 002C       INC   <SFCOMW+44          PARENTVE

0257   E800 0000 0027       LDR   SR6,<SFCOMW+39      LEVEL
025A   6D01                 CMV   SR6,1
025B   0901 0000            BE    6

025D   9B88 0000 001A       LAB   SS1,a<LSTEMP+26     FVLFN
0260   9F80 0000 011C       STB   SS1,<SFCOMW+284
0263   AB88 0000 0012       LAB   SS2,a<LSTEMP+18     OUTBUF
0266   1C01                 LDV   SR1,1
0267   AF90 0000 011C       STR   SS2,<SFCOMW+284,SR1
026A   CB88 0000 0010       LAB   SS4,a<LSTEMP+16     OUTLEN
026D   2C03                 LDV   SR2,3
026E   CFA0 0000 011C       STR   SS4,<SFCOMW+284,SR2
0271   DB88 0000 0006       LAB   SS5,a<LSTEMP+6      STATUS
0274   3C04                 LDV   SR3,4
0275   DFB0 0000 011C       STB   SS5,<SFCOMW+284,SR3
0278   FB80 0000 011B       LAB   SS7,<SFCOMW+283
027B   D380 0000 0000       LNJ   SS5,<RDVECT
027E   BC80 0000 0007       LDB   SS3,<SFCOMW+7

0281   E808 0000 0006       LDR   SR6,a<LSTEMP+6      STATUS
0284   6D00                 CMV   SR6,0
0285   0901 0000            BE    M28

0287   FB80 0000 012A       LAB   SS7,<SFCOMW+298
028A   D380 0000 0000       LNJ   SS5,<EROUT
028D   BC80 0000 0007       LDB   SS3,<SFCOMW+7

0290   0F81 FFA6            B     100

0292               M28      EQU   S 0292                6       EQU   S

0292   E800 0000 0027       LDR   SR6,<SFCOMW+39      LEVEL
0295   6D01                 CMV   SR6,1
0296   0981 0000            BNE   M37

0298   5C00                 LDV   SR5,0
0299   DF00 0000 002D       STR   SR5,<SFCOMW+45      REFCOORD 029C   0F81 0000            B     M36
029E               M37      EQU   S 029E   1C0A                 LDV   SR1,10
029F   9898 0000 0000       SLD   SS1,a<LSTEMP,SR1    OUTBUF
02A2   9056                 SST   SS1,=SR6
02A3   EF00 0000 0029       STR   SR6,<SFCOMW+41      VERTSLEN

02A6   2C07                 LDV   SR2,7
02A7   A8A8 0000 0000       SLD   SS2,a<LSTEMP,SR2    OUTBUF
02AA   A056                 SST   SS2,=SR6
02AB   6EFF                 ADV   SR6,-1
02AC   EF00 0000 002D       STR   SR6,<SFCOMW+45      REFCOORD

02AF               M36      EQU   S
```

```
        02AF   1C03                       LDV    SR1,3
        02B0   9898 0000 0000             SLD    SS1,*<LSTEMP,SR1      OUTBUF
        02B3   D880 0000 002A             SCM    SS1,<SFCOMW+42        REVERSE
        02B6   4581 0000                  SBNE   M40

02B8   E800 0000 0029             LDR    SR6,<SFCOMW+41        VERTSLEN
        02BB   EF00 0000 002E             STR    SR6,<SFCOMW+46        START

02BE   5C01                       LDV    SR5,1
        02BF   DF00 0000 002F             STR    SR5,<SFCOMW+47        END

02C2   4CFF                       LDV    SR4,-1
        02C3   CF00 0000 0030             STR    SR4,<SFCOMW+48        INCR

02C6   0F81 0000                  B      M39
        02C8                       M40    EQU    $

02C8   6C01                       LDV    SR6,1
        02C9   EF00 0000 002E             STR    SR6,<SFCOMW+46        START

02CC   0800 0000 0029             LDR    SR5,<SFCOMW+41        VERTSLEN
        02CF   DF00 0000 002F             STR    SR5,<SFCOMW+47        END

02D2   EF00 0000 0030             STR    SR6,<SFCOMW+48        INCR

02D5                       M39    EQU    $

02D5   6C00                       LDV    SR6,0
        02D6   EF00 0000 0031             STR    SR6,<SFCOMW+49        IDX

02D9   D800 0000 002E             LDR    SR5,<SFCOMW+46        START
        02DC   DF00 0000 0032             STR    SR5,<SFCOMW+50        N
        02DF   E800 0000 002F             LDR    SR6,<SFCOMW+47        END
        02E2   E200 0000 0032             SUB    SR6,<SFCOMW+50        N
        02E5   EA00 0000 0030             ADD    SR6,<SFCOMW+48        INCR
        02E8   E300 0000 0030             DIV    SR6,<SFCOMW+48        INCR
        02EB   6EFF                       ADV    SR6,-1
        02EC   6801 0000                  BLZ    SR6,M42
        02EE   EF00 0000 0022             STR    SR6,<LSTEMP+34        T#17
        02F1   6CFF                       LDV    SR6,-1
        02F2   EA00 0000 0020             ADD    SR6,<SFCOMW+45        REFCOORD
        02F5   DA56                       ADD    SR5,=SR6
        02F6   DF00 0000 0024             STR    SR5,<LSTEMP+36        T#19
        02F9                       M43    EQU    $

02F9   8A80 0000 0031             INC    <SFCOMW+49            IDX

02FC   FB80 0000 0131             LAB    S87,<SFCOMW+305
        02FF   D380 0000 0000             LNJ    S85,<Z1FMD0
        0302   EA00 0000 001A             ADD    SR6,<SFCOMW+26        XCOOR
        0305   EF00 0000 0033             STR    SR6,<SFCOMW+51        ADDRESS 0308   9800 0000 0031             LDR    SR1,<SFCOMW+49        IDX
        030B   9A00 0000 001F             ADD    SR1,<SFCOMW+31        XTEMP
        030E   1EFF                       ADV    SR1,-1
        030F   A856                       LDR    SR2,=SR6
        0310   0828 0000 0004             LDR    SR5,*<LSTEMP+4,SR2    WRKBUF
        0313   DF18 0000 0004             STR    SR5,*<LSTEMP+4,SR1    WRKBUF

0316   F880 0000 0131             LAB    S87,<SFCOMW+305
        0319   D380 0000 0000             LNJ    S85,<Z1FMD0
        031C   EA00 0000 001B             ADD    SR6,<SFCOMW+27        YCOOR
        031F   EF00 0000 0033             STR    SR6,<SFCOMW+51        ADDRESS 0322   9800 0000 0031             LDR    SR1,<SFCOMW+49        IDX
        0325   9A00 0000 0020             ADD    SR1,<SFCOMW+32        YTEMP
```

```
0328   1EFF                    ADV    SR1,-1
0329   A856                    LDR    SR2,=SR6
032A   D828 0000 0004          LDR    SR5,*<LSTEMP+4,SR2    WRKBUF
032D   DF18 0000 0004          STR    SR5,*<LSTEMP+4,SR1    WRKBUF

0330   C800 0000 0024          LDR    SR4,<LSTEMP+36        T#19
0333   CA00 0000 0030          ADD    SR4,<SFCOMW+48        INCR
0336   CF00 0000 0024          STR    SR4,<LSTEMP+36        T#19
0339   B800 0000 0032          LDR    SR3,<SFCOMW+50        N
033C   BA00 0000 0030          ADD    SR3,<SFCOMW+48        INCR
033F   BF00 0000 0032          STR    SR3,<SFCOMW+50        N
0342   8880 0000 0022          DEC    <LSTEMP+34            T#17
0345   0601 FFB3               BCT    M43
0347                   M42     EQU    S 0347   6C01                    LDV    SR6,1
0348   EF00 0000 0034          STR    SR6,<SFCOMW+52        HULLPNTR 034B   98C0 0000               SLD    SS1,PC#3
034D   9D00 0000 0035          SST    SS1,<SFCOMW+53        TOLRNC

0350   D800 0000 0029          LDR    SR5,<SFCOMW+41        VERTSLEN
0353   5D02                    CMV    SR5,2
0354   0881 0000               BAGE   M45

0356   F880 0000 013A          LAB    SB7,<SFCOMW+314
0359   D380 0000 0000          LNJ    SB5,<EROUT
035C   BC80 0000 0007          LDB    SB3,<SFCOMW+7

035F   0F81 FF31               B      100

0361                   M45     EQU    S 0361   9800 0000 001F          LDR    SR1,<SFCOMW+31        XTEMP
0364   9898 0000 0004          LAB    SB1,*<LSTEMP+4,SR1    WRKBUF
0367   9F80 0000 0142          STB    SB1,<SFCOMW+322
036A   A800 0000 0020          LDR    SR2,<SFCOMW+32        YTEMP
036D   ABA8 0000 0004          LAB    SB2,*<LSTEMP+4,SR2    WRKBUF
0370   3C01                    LDV    SR3,1
0371   AFB0 0000 0142          STB    SB2,<SFCOMW+322,SR3
0374   1C01                    LDV    SR1,1
0375   C898 0000 0004          LAB    SB4,*<LSTEMP+4,SR1    WRKBUF
0378   1C05                    LDV    SR1,5
0379   CF90 0000 0142          STR    SB4,<SFCOMW+322,SR1
037C   D888 0000 0006          LAB    SB5,*<LSTEMP+6        STATUS
037F   1C08                    LDV    SR1,8
0380   DF90 0000 0142          STB    SB5,<SFCOMW+322,SR1
0383   F880 0000 0141          LAB    SB7,<SFCOMW+321
0386   D380 0000 0000          LNJ    SB5,<CVHULL
0389   BC80 0000 0007          LDB    SB3,<SFCOMW+7

038C   E808 0000 0006          LDR    SR6,*<LSTEMP+6        STATUS
038F   6D00                    CMV    SR6,0
0390   0901 0000               BE     M48

0392   F880 0000 0158          LAB    SB7,<SFCOMW+344
0395   D380 0000 0000          LNJ    SB5,<EROUT
0398   BC80 0000 0007          LDB    SB3,<SFCOMW+7

039B   0F81 FFC4               B      100
```

```
039D                              M48     EQU     $

039D   E800 0000 0027             LDR     $R6,<$FCOMW+39        LEVEL
03A0   6001                       CMV     $R6,1
03A1   0981 0000                  BNE     M51

03A3   98D6                       SLD     $S1,=$R6
03A4   1C01                       LDV     $R1,1
03A5   9D18 0000 0000             SST     $S1,*<LSTEMP,$R1      OUTBUF

03A8   2C05                       LDV     $R2,5
03A9   D828 0000 0002             LDR     $R5,*<LSTEMP+2,$R2    DESCR
03AC   98D5                       SLD     $S1,=$R5
03AD   3C02                       LDV     $R3,2
03AE   9D38 0000 0000             SST     $S1,*<LSTEMP,$R3      OUTBUF

03B1   1C04                       LDV     $R1,4
03B2   C818 0000 0002             LDR     $R4,*<LSTEMP+2,$R1    DESCR
03B5   1C03                       LDV     $R1,3
03B6   C218 0000 0002             SUB     $R4,*<LSTEMP+2,$R1    DESCR
03B9   98D4                       SLD     $S1,=$R4
03BA   99C0 FE95                  SAD     $S1,PC#2
03BC   1C04                       LDV     $R1,4
03BD   9D18 0000 0000             SST     $S1,*<LSTEMP,$R1      OUTBUF

03C0   E838 0000 0002             LDR     $R6,*<LSTEMP+2,$R3    DESCR
03C3   1C01                       LDV     $R1,1
03C4   E218 0000 0002             SUB     $R6,*<LSTEMP+2,$R1    DESCR
03C7   98D6                       SLD     $S1,=$R6
03C8   99C0 FFF2                  SAD     $S1,PC#2
03CA   9D28 0000 0000             SST     $S1,*<LSTEMP,$R2      OUTBUF

03CD   1C04                       LDV     $R1,4
03CE   A898 0000 0000             SLD     $S2,*<LSTEMP,$R1      OUTBUF
03D1   EC51                       SDV     $S2,=$S1
03D2   1C03                       LDV     $R1,3
03D3   AD18 0000 0000             SST     $S2,*<LSTEMP,$R1      OUTBUF

03D6   9800 0000 001A             LDR     $R1,<$FCOMW+26        XCOOR
03D9   9898 0000 0004             LAB     $B1,*<LSTEMP+4,$R1    WRKBUF
03DC   9F80 0000 0160             STB     $B1,<$FCOMW+352
03DF   9800 0000 001B             LDR     $R1,<$FCOMW+27        YCOOR
03E2   AB98 0000 0004             LAB     $B2,*<LSTEMP+4,$R1    WRKBUF
03E5   1C01                       LDV     $R1,1
03E6   AF90 0000 0160             STB     $B2,<$FCOMW+352,$R1
03E9   C888 0000 0006             LAB     $B4,*<LSTEMP+6        STATUS
03EC   1C06                       LDV     $R1,6
03ED   CF90 0000 0160             STB     $B4,<$FCOMW+352,$R1
03F0   FB80 0000 015F             LAB     $B7,<$FCOMW+351
03F3   D380 0000 0000             LNJ     $B5,<VTPMTR
03F6   8C80 0000 0007             LDB     $B3,<$FCOMW+7

03F9   E800 0000 001C             LDR     $R6,<$FCOMW+28        NUMCOORDS
```

```
03FC   EA00 0000 0020        ADD    SR6,<SFCOMM+32      YTEMP
03FF   EF00 0000 003A        STR    SR6,<SFCOMM+58      XTEMP2

0402   EA00 0000 0037        ADD    SR6,<SFCOMM+55      HULLENGTH
0405   EF00 0000 0025        STR    SR6,<LSTEMP+37      T#20
0408   6E01                  ADV    SR6,1
0409   EF00 0000 0038        STR    SR6,<SFCOMM+59      YTEMP2

040C   5C00                  LDV    SR5,0
040D   DF00 0000 0032        STR    SR5,<SFCOMM+50      N
0410   5CFF                  LDV    SR5,-1
0411   DA00 0000 0037        ADD    SR5,<SFCOMM+55      HULLENGTH
0414   DF00 0000 0026        STR    SR5,<LSTEMP+38      T#21
0417   D200 0000 0032        SUB    SR5,<SFCOMM+50      N
041A   5801 0000             BLZ    SR5,M53
041C   B856                  LDR    SR3,=SR6
041D   C800 0000 003A        LDR    SR4,<SFCOMM+58      XTEMP2
0420   2C01                  LDV    SR2,1
0421              M54        EQU    $ 0421   9828 0000 0004        LDR    SR1,*<LSTEMP+4,SR2  WRKBUF
0424   9A00 0000 001A        ADD    SR1,<SFCOMM+26      XCOOR
0427   1EFF                  ADV    SR1,-1
0428   9F00 0000 0027        STR    SR1,<LSTEMP+39      T#22
042B   9854                  LDR    SR1,=SR4
042C   9800 0000 0027        LDR    SR1,<LSTEMP+39      T#22
042F   E818 0000 0004        LDR    SR6,*<LSTEMP+4,SR1  WRKBUF
0432   9854                  LDR    SR1,=SR4
0433   EF18 0000 0004        STR    SR6,*<LSTEMP+4,SR1  WRKBUF 0436   9828 0000 0004        LDR    SR1,*<LSTEMP+4,SR2  WRKBUF
0439   9A00 0000 001B        ADD    SR1,<SFCOMM+27      YCOOR
043C   1EFF                  ADV    SR1,-1
043D   E818 0000 0004        LDR    SR6,*<LSTEMP+4,SR1  WRKBUF
0440   EF38 0000 0004        STR    SR6,*<LSTEMP+4,SR3  WRKBUF 0443   3E01                  ADV    SR3,1
0444   4E01                  ADV    SR4,1
0445   2E01                  ADV    SR2,1
0446   8A80 0000 0032        INC    <SFCOMM+50          N
0449   5758                  BDEC   SR5,>M54
044A              M53        EQU    $ 044A   1C01                  LDV    SR1,1
044B   A818 0000 0004        LDR    SR2,*<LSTEMP+4,SR1  WRKBUF
044E   AA00 0000 001A        ADD    SR2,<SFCOMM+26      XCOOR
0451   2EFF                  ADV    SR2,-1
0452   B800 0000 0025        LDR    SR3,<LSTEMP+37      T#20
0455   E828 0000 0004        LDR    SR6,*<LSTEMP+4,SR2  WRKBUF
0458   EF38 0000 0004        STR    SR6,*<LSTEMP+4,SR3  WRKBUF 045B   9800 0000 0037        LDR    SR1,<SFCOMM+55      HULLENGTH
045E   9A00 0000 003B        ADD    SR1,<SFCOMM+59      YTEMP2
0461   9F00 0000 0028        STR    SR1,<LSTEMP+40      T#23
0464   1C01                  LDV    SR1,1
0465   9818 0000 0004        LDR    SR1,*<LSTEMP+4,SR1  WRKBUF
0468   9A00 0000 001B        ADD    SR1,<SFCOMM+27      YCOOR
046B   1EFF                  ADV    SR1,-1
046C   9F00 0000 0029        STR    SR1,<LSTEMP+41      T#24
046F   9800 0000 0028        LDR    SR1,<LSTEMP+40      T#23
0472   9800 0000 0029        LDR    SR1,<LSTEMP+41      T#24
0475   D818 0000 0004        LDR    SR5,*<LSTEMP+4,SR1  WRKBUF
0478   9800 0000 0028        LDR    SR1,<LSTEMP+40      T#23
047B   DF18 0000 0004        STR    SR5,*<LSTEMP+4,SR1  WRKBUF
```

```
047E  4C01            LDV   SR4,1
047F  CA00 0000 0037  ADD   SR4,<$FCOMW+55        HULLENGTH
0482  CF00 0000 003C  STR   SR4,<$FCOMW+60        PMTRLEN 0485  9800 0000 003A  LDR   SR1,<$FCOMW+58        XTEMP2
0488  9898 0000 0004  LAB   SB1,*<LSTEMP+4,SR1    WRKBUF
048B  9F80 0000 016F  STB   SB1,<$FCOMW+367
048E  9800 0000 003B  LDR   SR1,<$FCOMW+59        YTEMP2
0491  A898 0000 0004  LAB   SB2,*<LSTEMP+4,SR1    WRKBUF
0494  1C01            LDV   SR1,1
0495  AF90 0000 016F  STB   SB2,<$FCOMW+367,SR1
0498  CB88 0000 0006  LAB   SB4,*<LSTEMP+6        STATUS
049B  1C06            LDV   SR1,6
049C  CF90 0000 016F  STB   SB4,<$FCOMW+367,SR1
049F  F880 0000 016E  LAB   SB7,<$FCOMW+366
04A2  0380 0000 0000  LNJ   SB5,<VTPMTR
04A5  8C80 0000 0007  LDB   SB3,<$FCOMW+7

04A8  9800 0000 003A  LDR   SR1,<$FCOMW+58        XTEMP2
04AB  9898 0000 0004  LAB   SB1,*<LSTEMP+4,SR1    WRKBUF
04AE  9F80 0000 017E  STB   SB1,<$FCOMW+382
04B1  A800 0000 003B  LDR   SR2,<$FCOMW+59        YTEMP2
04B4  ABA8 0000 0004  LAB   SB2,*<LSTEMP+4,SR2    WRKBUF
04B7  3C01            LDV   SR3,1
04B8  AF80 0000 017E  STB   SB2,<$FCOMW+382,SR3
04BB  CB88 0000 0006  LAB   SB4,*<LSTEMP+6        STATUS
04BE  1C06            LDV   SR1,6
04BF  CF90 0000 017E  STB   SB4,<$FCOMW+382,SR1
04C2  F880 0000 0170  LAB   SB7,<$FCOMW+381
04C5  0380 0000 0000  LNJ   SB5,<VTAREA
04C8  8C80 0000 0007  LDB   SB3,<$FCOMW+7

04CB  1C06            LDV   SR1,6
04CC  9880 0000 0038  SLD   SS1,<$FCOMW+56        RPERIM
04CF  9018 0000 0000  SST   SS1,*<LSTEMP,SR1      OUTBUF

04D2  8C88 0000 001E  LDI   *<LSTEMP+30           RAREA
04D5  9807            SLD   SS1,=SR7
04D6  2C08            LDV   SR2,8
04D7  9028 0000 0000  SST   SS1,*<LSTEMP,SR2      OUTBUF

04DA  3C09            LDV   SR3,9
04DB  A880 0000 003F  SLD   SS2,<$FCOMW+63        CAREA
04DE  AD38 0000 0000  SST   SS2,*<LSTEMP,SR3      OUTBUF

04E1  98A8 0000 0000  SLD   SS1,*<LSTEMP,SR2      OUTBUF
04E4  DC52            SDV   SS1,=SS2
04E5  1C07            LDV   SR1,7
04E6  9018 0000 0000  SST   SS1,*<LSTEMP,SR1      OUTBUF

04E9  9888 0000 000E  SLD   SS1,*<LSTEMP+14       MINPCT
04EC  9D00 0000 0041  SST   SS1,<$FCOMW+65        SMOOTH

04EF  1C01            LDV   SR1,1
04F0  E818 0000 0002  LDR   SR6,*<LSTEMP+2,SR1    DESCR
04F3  9806            SLD   SS1,=SR6
```

```
04F4   1C0A                        LDV    SR1,10
04F5   9D18 0000 0000              SST    SS1,*<LSTEMP,SR1      OUTBUF

04F8   1C02                        LDV    SR1,2
04F9   D818 0000 0002              LDR    SR5,*<LSTEMP+2,SR1    DESCR
04FC   98D5                        SLD    SS1,=SR5
04FD   1C0B                        LDV    SR1,11
04FE   9D18 0000 0000              SST    SS1,*<LSTEMP,SR1      OUTBUF 0501   1C03                        LDV    SR1,3
0502   C818 0000 0002              LDR    SR4,*<LSTEMP+2,SR1    DESCR
0505   98D4                        SLD    SS1,=SR4
0506   1C0C                        LDV    SR1,12
0507   9D18 0000 0000              SST    SS1,*<LSTEMP,SR1      OUTBUF 050A   1C04                        LDV    SR1,4
050B   E818 0000 0002              LDR    SR6,*<LSTEMP+2,SR1    DESCR
050E   98D6                        SLD    SS1,=SR6
050F   1C0D                        LDV    SR1,13
0510   9D18 0000 0000              SST    SS1,*<LSTEMP,SR1      OUTBUF

0513   E808 0000 0010              LDR    SR6,*<LSTEMP+16       OUTLEN
0516   98D6                        SLD    SS1,=SR6
0517   E800 0000 0029              LDR    SR6,<SFCOMM+41        VERTSLE
051A   9D00 0000 002A              SST    SS1,<LSTEMP+42        T#25
051D   98D6                        SLD    SS1,=SR6
051E   0C00 0000 002A              SDV    SS1,<LSTEMP+42        T#25
0521   9D56                        SST    SS1,=SR6
0522   6E01                        ADV    SR6,1
0523   EF00 0000 0043              STR    SR6,<SFCOMM+67        NUMVECT 0526   6C02                        LDV    SR6,2
0527   EA08 0000 0018              ADD    SR6,*<LSTEMP+24       FVPOS
052A   EF00 0000 0044              STR    SR6,<SFCOMM+68        XCOOR-I

052D   EA00 0000 0043              ADD    SR6,<SFCOMM+67        NUMVECT
0530   EF00 0000 0045              STR    SR6,<SFCOMM+69        YCOOR-I

0533   E800 0000 0044              LDR    SR6,<SFCOMM+68        XCOOR-I
0536   98D6                        SLD    SS1,=SR6
0537   1C0E                        LDV    SR1,14
0538   9D18 0000 0000              SST    SS1,*<LSTEMP,SR1      OUTBUF

053B   E800 0000 0045              LDR    SR6,<SFCOMM+69        YCOOR-I
053E   98D6                        SLD    SS1,=SR6
053F   1C0F                        LDV    SR1,15
0540   9D18 0000 0000              SST    SS1,*<LSTEMP,SR1      OUTBUF

0543   E800 0000 0043              LDR    SR6,<SFCOMM+67        NUMVECT
0546   98D6                        SLD    SS1,=SR6
0547   9998 0000 0000              SAD    SS1,*<LSTEMP,SR1      OUTBUF
054A   1C10                        LDV    SR1,16
054B   9D18 0000 0000              SST    SS1,*<LSTEMP,SR1      OUTBUF 054E   1C12                        LDV    SR1,18
054F   9880 0000 003D              SLD    SS1,<SFCOMM+61        CPERIM
0552   9D18 0000 0000              SST    SS1,*<LSTEMP,SR1      OUTBUF 0555   9880 0000 0038              SLD    SS1,<SFCOMM+56        RPERIM
0558   DC00 0000 003D              SDV    SS1,<SFCOMM+61        CPERIM
055B   1C13                        LDV    SR1,19
055C   9D18 0000 0000              SST    SS1,*<LSTEMP,SR1      OUTBUF 055F   9808 0000 0010              LDR    SR1,*<LSTEMP+16       OUTLEN
0562   98C0 0000                   SLD    SS1,PC#4
0564   9D18 0000 0000              SST    SS1,*<LSTEMP,SR1      OUTBUF
```

```
0567  9D56                       SST    SS1,=SR6
0568  EF00 0000 002E             STR    SR6,<SFCOMW+46        START 0568  1EFF                       ADV    SR1,-1
056C  9F00 0000 002F             STR    SR1,<SFCOMW+47        END 056F  9888 0000 0012             LAB    SB1,*<LSTEMP+18       OUTBUF
0572  9F80 0000 0180             STB    SB1,<SFCOMW+397
0575  A888 0000 0010             LAB    SB2,*<LSTEMP+16       OUTLEN
0578  1C01                       LDV    SR1,1
0579  AF90 0000 0180             STB    SB2,<SFCOMW+397,SR1
057C  F880 0000 018C             LAB    SB7,<SFCOMW+396
057F  D380 0000 0000             LNJ    SB5,<CLRBFR
0582  8C80 0000 0007             LDB    SB3,<SFCOMW+7

0585  8A88 0000 0018             INC    *<LSTEMP+24           FVPOS 0588  9888 0000 001A             LAB    SB1,*<LSTEMP+26       FVLFN
058B  9F80 0000 019A             STB    SB1,<SFCOMW+410
058E  A888 0000 0018             LAB    SB2,*<LSTEMP+24       FVPOS
0591  1C02                       LDV    SR1,2
0592  AF90 0000 019A             STB    SB2,<SFCOMW+410,SR1
0595  C888 0000 0012             LAB    SB4,*<LSTEMP+18       OUTBUF
0598  2C03                       LDV    SR2,3
0599  CFA0 0000 019A             STB    SB4,<SFCOMW+410,SR2
059C  D888 0000 0010             LAB    SB5,*<LSTEMP+16       OUTLEN
059F  3C04                       LDV    SR3,4
05A0  DF80 0000 019A             STB    SB5,<SFCOMW+410,SR3
05A3  E888 0000 0006             LAB    SB6,*<LSTEMP+6        STATUS
05A6  1C05                       LDV    SR1,5
05A7  EF90 0000 019A             STB    SB6,<SFCOMW+410,SR1
05AA  F880 0000 0199             LAB    SB7,<SFCOMW+409
05AD  D380 0000 0000             LNJ    SB5,<VCTOUT
05B0  8C80 0000 0007             LDB    SB3,<SFCOMW+7

05B3  E808 0000 0006             LDR    SR6,*<LSTEMP+6        STATUS
05B6  6D00                       CMV    SR6,0
05B7  0901 0000                  BE     M30
05B9  8388 0000 0000             JMP    *<SFCOMW
05BC                      M30    EQU    $

05BC  E808 0000 0018             LDR    SR6,*<LSTEMP+24       FVPOS
05BF  EF00 0000 0046             STR    SR6,<SFCOMW+70        HEADER

05C2  EF00 0000 002C             STR    SR6,<SFCOMW+44        PARENTVECI

05C5  5C01                       LDV    SR5,1
05C6  0F00 0000 0047             STR    SR5,<SFCOMW+71        K
05C9  E800 0000 0043             LDR    SR6,<SFCOMW+67        NUMVECTS-)
05CC  E200 0000 0047             SUB    SR6,<SFCOMW+71        K
05CF  6801 0000                  BLZ    SR6,M56
05D1  EF00 0000 0023             STR    SR6,<LSTEMP+35        T#18
05D4  E800 0000 002F             LDR    SR6,<SFCOMW+47        END
05D7  E256                       SUB    SR6,=SR6
05D8  EF00 0000 002C             STR    SR6,<LSTEMP+44        T#26
05DB                      M57    EQU    $

05D8  9888 0000 0012             LAB    SB1,*<LSTEMP+18       OUTBUF
05DE  9F80 0000 01A7             STB    SB1,<SFCOMW+423
05E1  A888 0000 0010             LAB    SB2,*<LSTEMP+16       OUTLEN
05E4  1C01                       LDV    SR1,1
05E5  AF90 0000 01A7             STB    SB2,<SFCOMW+423,SR1
05E8  C888 0000 0010             LAB    SB4,*<LSTEMP+16       OUTLEN
```

```
05EB  2C03            LDV   SR2,3
05EC  CFA0 0000 01A7  STB   SB4,<SFCOMW+423,SR2
05EF  F880 0000 01A6  LAB   SB7,<SFCOMW+422
05F2  D380 0000 0000  LNJ   SB5,<CLRBFR
05F5  8C80 0000 0007  LDB   SB3,<SFCOMW+7

05F8  6C01            LDV   SR6,1
05F9  EF00 0000 0048  STR   SR6,<SFCOMW+72        L
05FC  D800 0000 002F  LDR   SR5,<SFCOMW+47        END
05FF  D200 0000 0048  SUB   SR5,<SFCOMW+72        L
0602  5801 0000       BLZ   SR5,M58
0604  A856            LDR   SR2,=SR6
0605  B852            LDR   SR3,=SR2
0606  BA00 0000 002C  ADD   SR3,<LSTEMP+44        T#26
0609              M59 EQU   $

0609  BF00 0000 0049  STR   SR3,<SFCOMW+73        STACKPOIN 060C  9800 0000 001A  LDR   SR1,<SFCOMW+26        XCOOR
060F  9A53            ADD   SR1,=SR3
0610  1EFF            ADV   SR1,=1
0611  E818 0000 0004  LDR   SR6,*<LSTEMP+4,SR1    WRKBUF
0614  98D6            SLD   SS1,=SR6
0615  9D28 0000 0000  SST   SS1,*<LSTEMP,SR2      OUTBUF

0618  C853            LDR   SR4,=SR3
0619  C900 0000 0029  CMR   SR4,<SFCOMW+41        VERTSLEN
061C  0901 0000       BE    15

061E  2E01            ADV   SR2,1
061F  3E01            ADV   SR3,1
0620  8A80 0000 0048  INC   <SFCOMW+72            L
0623  5766            BDEC  SR5,>M59
0624              M58 EQU   $ 0624              15  EQU   $
0624  E800 0000 0048  LDR   SR6,<SFCOMW+72        L
0627  98D6            SLD   SS1,=SR6
0628  9808 0000 0010  LDR   SR1,*<LSTEMP+16       OUTLEN
062B  9D18 0000 0000  SST   SS1,*<LSTEMP,SR1      OUTBUF 062E  8A88 0000 0018  INC   *<LSTEMP+24           FVPOS 0631  9B88 0000 001A  LAB   SB1,*<LSTEMP+26       FVLFN
0634  9F80 0000 01B4  STB   SB1,<SFCOMW+436
0637  AB88 0000 0018  LAB   SB2,*<LSTEMP+24       FVPOS
063A  2C02            LDV   SR2,2
063B  AFA0 0000 01B4  STB   SB2,<SFCOMW+436,SR2
063E  C888 0000 0012  LAB   SB4,*<LSTEMP+18       OUTBUF
0641  3C03            LDV   SR3,3
0642  CFB0 0000 01B4  STB   SB4,<SFCOMW+436,SR3
0645  D888 0000 0010  LAB   SB5,*<LSTEMP+16       OUTLEN
0648  1C04            LDV   SR1,4
0649  DF90 0000 01B4  STB   SB5,<SFCOMW+436,SR1
064C  E888 0000 0006  LAB   SB6,*<LSTEMP+6        STATUS
064F  1C05            LDV   SR1,5
0650  EF90 0000 01B4  STB   SB6,<SFCOMW+436,SR1
0653  F880 0000 01B3  LAB   SB7,<SFCOMW+435
0656  D380 0000 0000  LNJ   SB5,<VCTOUT
0659  8C80 0000 0007  LDB   SB3,<SFCOMW+7

065C  E808 0000 0006  LDR   SR6,*<LSTEMP+6        STATUS
065F  6D00            CMV   SR6,0
0660  0901 0000       BE    M32
0662  8388 0000 0000  JMP   *<SFCOMW
0665              M32 EQU   $ 0665  9B88 0000 0012  LAB   SB1,*<LSTEMP+18       OUTBUF
0668  9F80 0000 01C1  STB   SB1,<SFCOMW+449
```

```
0668  A888 0000 0010        LAB   $B2,*<LSTEMP+16       OUTLEN
066E  1C01                  LDV   SR1,1
066F  AF90 0000 01C1        STB   $B2,<SFCOMW+449,SR1
0672  C888 0000 0010        LAB   $B4,*<LSTEMP+16       OUTLEN
0675  2C03                  LDV   SR2,3
0676  CFA0 0000 01C1        STB   $B4,<SFCOMW+449,SR2
0679  F880 0000 01C0        LAB   $B7,<SFCOMW+448
067C  0380 0000 0000        LNJ   $B5,<CLRBFR
067F  BC80 0000 0007        LDB   $B3,<SFCOMW+7

0682  6C01                  LDV   SR6,1
0683  EF00 0000 0048        STR   SR6,<SFCOMW+72        L
0686  D800 0000 002F        LDR   SR5,<SFCOMW+47        END
0689  D200 0000 0048        SUB   SR5,<SFCOMW+72        L
068C  5801 0000             BLZ   SR5,M62
068E  A856                  LDR   SR2,=SR6
068F  B852                  LDR   SR3,=SR2
0690  8A00 0000 002C        ADD   SR3,<LSTEMP+44        T#26
0693                   M63  EQU   $

0693  BF00 0000 0049        STR   SR3,<SFCOMW+73        STACKPOI 0696  9800 0000 001B        LDR   SR1,<SFCOMW+27        YCOOR
0699  9A53                  ADD   SR1,=SR3
069A  1EFF                  ADV   SR1,-1
069B  E818 0000 0004        LDR   SR6,*<LSTEMP+4,SR1    WRKBUF
069E  98D6                  SLD   $S1,=SR6
069F  9D28 0000 0000        SST   $S1,*<LSTEMP,SR2      OUTBUF

06A2  C853                  LDR   SR4,=SR3
06A3  C900 0000 0029        CMR   SR4,<SFCOMW+41        VERTSLEN
06A6  0901 0000             BE    25

06A8  2E01                  ADV   SR2,1
06A9  3E01                  ADV   SR3,1
06AA  8A80 0000 0048        INC   <SFCOMW+72            L
06AD  5766                  BDEC  SR5,>M63
06AE                   M62  EQU   $

06AE              25        EQU   $
06AE  E800 0000 0048        LDR   SR6,<SFCOMW+72        L
06B1  98D6                  SLD   $S1,=SR6
06B2  9808 0000 0010        LDR   SR1,*<LSTEMP+16       OUTLEN
06B5  9D18 0000 0000        SST   $S1,*<LSTEMP,SR1      OUTBUF

06B8  D800 0000 0043        LDR   SR5,<SFCOMW+67        NUMVECTS
06BB  DA08 0000 0018        ADD   SR5,*<LSTEMP+24       FVPOS
06BE  DF00 0000 002D        STR   SR5,<LSTEMP+45        T#27
06C1  9888 0000 001A        LAB   $B1,*<LSTEMP+26       FVLEN
06C4  9F80 0000 01CE        STB   $B1,<SFCOMW+462
06C7  A888 0000 0012        LAB   $B2,*<LSTEMP+18       OUTBUF
06CA  2C03                  LDV   SR2,3
06CB  AFA0 0000 01CE        STB   $B2,<SFCOMW+462,SR2
06CE  C888 0000 0010        LAB   $B4,*<LSTEMP+16       OUTLEN
06D1  3C04                  LDV   SR3,4
06D2  CFB0 0000 01CE        STB   $B4,<SFCOMW+462,SR3
06D5  D888 0000 0006        LAB   $B5,*<LSTEMP+6        STATUS
06D8  1C05                  LDV   SR1,5
06D9  DF90 0000 01CE        STB   $B5,<SFCOMW+462,SR1
06DC  F880 0000 01CD        LAB   $B7,<SFCOMW+461
06DF  0380 0000 0000        LNJ   $B5,<VCTOUT
06E2  BC80 0000 0007        LDB   $B3,<SFCOMW+7

06E5  E808 0000 0006        LDR   SR6,*<LSTEMP+6        STATUS
06E8  6000                  CMV   SR6,0
06E9  0901 0000             BE    M34
06EB  8388 0000 0000        JMP   *<SFCOMW
06EE                   M34  EQU   $
```

```
06EE  E800 0000 002C           LDR   SR6,<LSTEMP+44       T#26
06F1  EA00 0000 002F           ADD   SR6,<SFCOMM+47       END
06F4  EF00 0000 002C           STR   SR6,<LSTEMP+44       T#26
06F7  8A80 0000 0047           INC   <SFCOMM+71           K
06FA  8880 0000 0023           DEC   <LSTEMP+35           T#18
06FD  0601 FEDD                BCT   M57
06FF                      M56  EQU   S

06FF  E800 0000 0045           LDR   SR6,<SFCOMM+67       NUMVECT:
0702  EA08 0000 0018           ADD   SR6,@<LSTEMP+24      FVPOS
0705  EF08 0000 0018           STR   SR6,@<LSTEMP+24      FVPOS

0708                      M51  EQU   S

0708  E808 0000 0018           LDR   SR6,@<LSTEMP+24      FVPOS
070B  EF00 0000 004A           STR   SR6,<SFCOMM+74       FVPOSO

070E  D800 0000 0020           LDR   SR5,<SFCOMM+32       YTEMP
0711  DA00 0000 0029           ADD   SR5,<SFCOMM+41       VERTSLEN
0714  5E01                     ADV   SR5,1
0715  DF00 0000 004B           STR   SR5,<SFCOMM+75       WRKPOS

0718  D208 0000 0014           SUB   SR5,@<LSTEMP+20      BUFLEN
071B  5EFF                     ADV   SR5,-1
071C  8255                     NEG   =SR5
071D  DF00 0000 004C           STR   SR5,<SFCOMM+76       WRKLEN 0720  4C01                     LDV   SR4,1
0721  CA00 0000 002D           ADD   SR4,<SFCOMM+45       REFCOORD
0724  CF00 0000 002E           STR   SR4,<LSTEMP+46       T#28
0727  9888 0000 001A           LAB   SR1,@<LSTEMP+26      FVLEN
072A  9F80 0000 01DB           STB   SR1,<SFCOMM+475
072D  A888 0000 0018           LAB   SR2,@<LSTEMP+24      FVPOS
0730  1C02                     LDV   SR1,2
0731  AF90 0000 01DB           STB   SR2,<SFCOMM+475,SR1
0734  A800 0000 001F           LDR   SR2,<SFCOMM+31       XTEMP
0737  CBA8 0000 0004           LAB   SR4,@<LSTEMP+4,SR2   WRKBUF
073A  3C05                     LDV   SR3,5
073B  CF90 0000 01DB           STB   SR4,<SFCOMM+475,SR3
073E  9800 0000 0020           LDR   SR1,<SFCOMM+32       YTEMP
0741  DB98 0000 0004           LAB   SR5,@<LSTEMP+4,SR1   WRKBUF
0744  1C06                     LDV   SR1,6
0745  DF90 0000 01DB           STB   SR5,<SFCOMM+475,SR1
0748  9800 0000 001D           LDR   SR1,<SFCOMM+29       ANGLES
074B  E898 0000 0004           LAB   SR6,@<LSTEMP+4,SR1   WRKBUF
074E  1C07                     LDV   SR1,7
074F  EF90 0000 01DB           STB   SR6,<SFCOMM+475,SR1
0752  1C01                     LDV   SR1,1
0753  FB98 0000 0004           LAB   SR7,@<LSTEMP+4,SR1   WRKBUF
0756  1C0A                     LDV   SR1,10
0757  FF90 0000 01DB           STB   SR7,<SFCOMM+475,SR1
075A  9800 0000 004B           LDR   SR1,<SFCOMM+75       WRKPOS
075D  9898 0000 0004           LAB   SR1,@<LSTEMP+4,SR1   WRKBUF
0760  1C0C                     LDV   SR1,12
0761  9F90 0000 01DB           STB   SR1,<SFCOMM+475,SR1
0764  9888 0000 0012           LAB   SR1,@<LSTEMP+18      OUTBUF
0767  1C0E                     LDV   SR1,14
0768  9F90 0000 01DB           STB   SR1,<SFCOMM+475,SR1
076B  9888 0000 0010           LAB   SR1,@<LSTEMP+16      OUTLEN
076E  1C0F                     LDV   SR1,15
076F  9F90 0000 01DB           STB   SR1,<SFCOMM+475,SR1
0772  9888 0000 0006           LAB   SR1,@<LSTEMP+6       STATUS
```

```
0775  1C13                        LDV    SR1,19
0776  9F90 0000 01D8              STB    SB1,<SFCOMW+475,SR1
0779  F880 0000 01DA              LAB    SB7,<SFCOMW+474
077C  D380 0000 0000              LNJ    SB5,<ARCFET
077F  BC80 0000 0007              LDB    SB3,<SFCOMW+7

0782  E808 0000 0006              LDR    SR6,*<LSTEMP+6        STATUS
0785  6D00                        CMV    SR6,0
0786  0901 0000                   BE     M67

0788  F880 0000 0207              LAB    SB7,<SFCOMW+519
078B  D380 0000 0000              LNJ    SB5,<EROUT
078E  BC80 0000 0007              LDB    SB3,<SFCOMW+7

0791  0F81 FC0A                   B      100

0793                      M67     EQU    $ 0793  9888 0000 001A              LAB    SB1,*<LSTEMP+26       FVLFN
0796  9F80 0000 020F              STB    SB1,<SFCOMW+527
0799  A888 0000 0018              LAB    SB2,*<LSTEMP+24       FVPOS
079C  1C02                        LDV    SR1,2
079D  AF90 0000 020F              STB    SB2,<SFCOMW+527,SR1
07A0  C888 0000 0012              LAB    SB4,*<LSTEMP+18       OUTBUF
07A3  2C05                        LDV    SR2,5
07A4  CFA0 0000 020F              STB    SB4,<SFCOMW+527,SR2
07A7  D888 0000 0010              LAB    SB5,*<LSTEMP+16       OUTLEN
07AA  3C06                        LDV    SR3,6
07AB  DF80 0000 020F              STB    SB5,<SFCOMW+527,SR3
07AE  E888 0000 0006              LAB    SB6,*<LSTEMP+6        STATUS
07B1  1C07                        LDV    SR1,7
07B2  EF90 0000 020F              STB    SB6,<SFCOMW+527,SR1
07B5  F880 0000 020E              LAB    SB7,<SFCOMW+526
07B8  D380 0000 0000              LNJ    SB5,<UPDATE
07BB  BC80 0000 0007              LDB    SB3,<SFCOMW+7

07BE  E808 0000 0006              LDR    SR6,*<LSTEMP+6        STATUS
07C1  6D00                        CMV    SR6,0
07C2  0901 0000                   BE     M70

07C4  F880 0000 0223              LAB    SB7,<SFCOMW+547
07C7  D380 0000 0000              LNJ    SB5,<EROUT
07CA  BC80 0000 0007              LDB    SB3,<SFCOMW+7

07CD  0F81 FFC4                   B      100

07CF                      M70     EQU    $

07CF  E808 0000 0018              LDR    SR6,*<LSTEMP+24       FVPOS
07D2  E200 0000 004A              SUB    SR6,<SFCOMW+74        FVPOS0
07D5  EF00 0000 004D              STR    SR6,<SFCOMW+77        SONS

07D8  EA00 0000 0025              ADD    SR6,<SFCOMW+37        NUMSONS
07DB  EF00 0000 0025              STR    SR6,<SFCOMW+37        NUMSONS

07DE  8A80 0000 0026              INC    <SFCOMW+38            PARENT

07E1  D800 0000 0026              LDR    SR5,<SFCOMW+38        PARENT
07E4  D900 0000 0028              CMR    SR5,<SFCOMW+40        NUMPARENTS
07E7  0A81 FA6C                   BALE   5

07E9  6D00                        CMV    SR6,0
07EA  0901 0000                   BE     M75
07EC  C800 0000 0027              LDR    SR4,<SFCOMW+39        LEVEL
07EF  C908 0000 0008              CMR    SR4,*<LSTEMP+8        NLEVELS
07F2  0981 0000                   BNE    M74
```

```
07F4                         M75     EQU     $

07F4   9888 0000 001A         LAB    $B1,*<LSTEMP+26       FVLFN
07F7   9F80 0000 022B         STB    $B1,<$FCOMW+555
07FA   A888 0000 0012         LAB    $B2,*<LSTEMP+18       OUTBUF
07FD   1C01                   LDV    $R1,1
07FE   AF90 0000 022B         STB    $B2,<$FCOMW+555,SR1
0801   CB88 0000 0010         LAB    $B4,*<LSTEMP+16       OUTLEN
0804   2C03                   LDV    $R2,3
0805   CFA0 0000 022B         STB    $B4,<$FCOMW+555,SR2
0808   D888 0000 0006         LAB    $B5,*<LSTEMP+6        STATUS
0808   3C04                   LDV    $R3,4
080C   DF80 0000 022B         STB    $B5,<$FCOMW+555,SR3
080F   F880 0000 022A         LAB    $B7,<$FCOMW+554
0812   D380 0000 0000         LNJ    $B5,<RDVECT
0815   BC80 0000 0007         LDB    $B3,<$FCOMW+7

0818   E800 0000 0027         LDR    $R6,<$FCOMW+39        LEVEL
081B   98D6                   SLD    $S1,=$R6
081C   1C01                   LDV    $R1,1
081D   9018 0000 0000         SST    $S1,*<LSTEMP,SR1      OUTBUF

0820   D800 0000 000F         LDR    $R5,<$FCOMW+15        TOTALSONS
0823   98D5                   SLD    $S1,=$R5
0824   2C14                   LDV    $R2,20
0825   9028 0000 0000         SST    $S1,*<LSTEMP,SR2      OUTBUF 0828   9888 0000 001A         LAB    $B1,*<LSTEMP+26       FVLFN
082B   9F80 0000 0236         STB    $B1,<$FCOMW+566
082E   A888 0000 0012         LAB    $B2,*<LSTEMP+18       OUTBUF
0831   3C01                   LDV    $R3,1
0832   AF80 0000 0236         STB    $B2,<$FCOMW+566,SR3
0835   CB88 0000 0010         LAB    $B4,*<LSTEMP+16       OUTLEN
0838   1C03                   LDV    $R1,3
0839   CF90 0000 0236         STB    $B4,<$FCOMW+566,SR1
083C   D888 0000 0006         LAB    $B5,*<LSTEMP+6        STATUS
083F   1C04                   LDV    $R1,4
0840   DF90 0000 0236         STB    $B5,<$FCOMW+566,SR1
0843   F880 0000 0235         LAB    $B7,<$FCOMW+565
0846   D380 0000 0000         LNJ    $B5,<WRVECT
0849   BC80 0000 0007         LDB    $B3,<$FCOMW+7

084C   8388 0000 0000         JMP    *<$FCOMW

084F                         M74     EQU     $

084F   E800 0000 0025         LDR    $R6,<$FCOMW+37        NUMSONS
0852   EF00 0000 0028         STR    $R6,<$FCOMW+40        NUMPARENT

0855   EA00 0000 000F         ADD    $R6,<$FCOMW+15        TOTALSONS
0858   EF00 0000 000F         STR    $R6,<$FCOMW+15        TOTALSONS 085B   8A80 0000 0027         INC    <$FCOMW+39            LEVEL 085E   5C01                   LDV    $R5,1
085F   DF00 0000 0026         STR    $R5,<$FCOMW+38        PARENT 0862   4C00                   LDV    $R4,0
0863   CF00 0000 0025         STR    $R4,<$FCOMW+37        NUMSONS

0866   CF00 0000 0024         STR    $R4,<$FCOMW+36        SEQNUM 0869   98C0 0000              SLD    $S1,PC#5
086B   9C00 0000 002A         SML    $S1,<$FCOMW+42        REVERSE
086E   9D00 0000 002A         SST    $S1,<$FCOMW+42        REVERSE 0871   0F81 F9E2              B      5
```

```
 0873                        100    EQU    $
 0873  F880 0000 0244               LAB    $B7,<$FCOMM+580
 0876  D380 0000 0000               LNJ    $B5,<EROUT
 0879  BC80 0000 0007               LDB    $B3,<$FCOMM+7

087C  F880 0000 0114               LAB    $B7,<$FCOMM+276
 087F  D380 0000 0000               LNJ    $B5,<EROUT
 0882  BC80 0000 0007               LDB    $B3,<$FCOMM+7

0885  6CFF                         LOV    $R6,-1
 0886  EF08 0000 0006               STR    $R6,*<LSTEMP+6          STATUS 0889  8388 0000 0000               JMP    *<$FCOMM
456          END 088C  0000               PC#0      DC     Z'0000'
 088D  8464               PC#1      DC     Z'8464'
 088E  0000                         DC     Z'0000'
 088F  8210               PC#2      DC     Z'8210'
 0890  0000                         DC     Z'0000'
 0891  0000               PC#3      DC     Z'0000'
 0892  0000                         DC     Z'0000'
 0893  8414               PC#4      DC     Z'8414'
 0894  0000                         DC     Z'0000'
 0895  8310               PC#5      DC     Z'8310'
 0896  0000                         DC     Z'0000'

004E                               ORG    <$FCOMM+78
 004E  000B                         DC     Z'0008'
 004F  0000 0000                    DC     0,0
 0051  0000 000C                    DC     <$FCOMM+12              NFEAT
 0053  0000 000D                    DC     <$FCOMM+13              NVECT
 0055  0000 000E                    DC     <$FCOMM+14              FVSIZE
 0057  0000 0000                    DC     0,0
 0059  0008                         DC     Z'0008'
 005A  0000                         DC     Z'0000'
 005B  0000 024C                    DC     <DC#1
 005D  0007                         DC     Z'0007'
 005E  0000 024B                    DC     <DC#0
 0060  0000 0059                    DC     <$FCOMM+89
 0062  0000 0000                    DC     0,0
 0064  0009                         DC     Z'0009'
 0065  0000 0010                    DC     <$FCOMM+16              SILFN
 0067  0000 0059                    DC     <$FCOMM+89
 0069  0000 0250                    DC     <DC#2
 006B  0000 0000                    DC     0,0
 006D  0020                         DC     Z'0020'
 006E  0000                         DC     Z'0000'
 006F  0000 0251                    DC     <DC#3
 0071  0007                         DC     Z'0007'
-0072  0000 006D                    DC     <$FCOMM+109
 0074  0000 0261                    DC     <DC#4
 0076  0000 0011                    DC     <$FCOMM+17              STAT
 0078  000F                         DC     Z'000F'
 0079  0000 0000                    DC     0,0
 007B  0000 0010                    DC     <$FCOMM+16              SILFN
 007D  0000 0000                    DC     0,0
 007F  0000 0012                    DC     <$FCOMM+18              FOUR
 0081  0000 0000                    DC     0,0
 0083  0000 0000                    DC     0,0
 0085  0000 0000                    DC     0,0
 0087  001E                         DC     Z'001E'
 0088  0000                         DC     Z'0000'
 0089  0000 0262                    DC     <DC#5
 008B  0007                         DC     Z'0007'
 008C  0000 0087                    DC     <$FCOMM+135
 008E  0000 0261                    DC     <DC#4
 0090  0000 0011                    DC     <$FCOMM+17              STAT
 0092  0005                         DC     Z'0005'
 0093  0000 0010                    DC     <$FCOMM+16              SILFN
```

| | | | |
|---|---|---|---|
| 0095 | 0000 0271 | DC | <DC#6 |
| 0097 | 0013 | DC | Z'0013' |
| 0098 | 0000 0010 | DC | <SFCOMM+16 | SILFN |
| 009A | 0000 0014 | DC | <SFCOMM+20 | XBEG |
| 009C | 0000 0015 | DC | <SFCOMM+21 | YBEG |
| 009E | 0000 0000 | DC | 0,0 |
| 00A0 | 0000 0000 | DC | 0,0 |
| 00A2 | 0000 0016 | DC | <SFCOMM+22 | CHAINLEN |
| 00A4 | 0000 0017 | DC | <SFCOMM+23 | STATS |
| 00A6 | 0000 0013 | DC | <SFCOMM+19 | NSTATS |
| 00A8 | 0000 0000 | DC | 0,0 |
| 00AA | 001F | DC | Z'001F' |
| 00AB | 0000 | DC | Z'0000' |
| 00AC | 0000 0272 | DC | <DC#7 |
| 00AE | 0007 | DC | Z'0007' |
| 00AF | 0000 00AA | DC | <SFCOMM+170 |
| 00B1 | 0000 0261 | DC | <DC#4 |
| 00B3 | 0000 0011 | DC | <SFCOMM+17 | STAT |
| 00B5 | 0005 | DC | Z'0005' |
| 00B6 | 0000 0010 | DC | <SFCOMM+16 | SILFN |
| 00B8 | 0000 0282 | DC | <DC#8 |
| 00BA | 0007 | DC | Z'0007' |
| 00BB | 0000 0010 | DC | <SFCOMM+16 | SILFN |
| 00BD | 0000 0059 | DC | <SFCOMM+89 |
| 00BF | 0000 0011 | DC | <SFCOMM+17 | STAT |
| 00C1 | 0015 | DC | Z'0015' |
| 00C2 | 0000 0000 | DC | 0,0 |
| 00C4 | 0000 0016 | DC | <SFCOMM+22 | CHAINLEN |
| 00C6 | 0000 0000 | DC | 0,0 |
| 00C8 | 0000 0000 | DC | 0,0 |
| 00CA | 0000 0019 | DC | <SFCOMM+25 | XYLEN |
| 00CC | 0000 001C | DC | <SFCOMM+28 | NUMCOORDS |
| 00CE | 0000 0014 | DC | <SFCOMM+20 | XBEG |
| 00D0 | 0000 0015 | DC | <SFCOMM+21 | YBEG |
| 00D2 | 0000 0000 | DC | 0,0 |
| 00D4 | 0000 0000 | DC | 0,0 |
| 00D6 | 001F | DC | Z'001F' |
| 00D7 | 0000 | DC | Z'0000' |
| 00D8 | 0000 0283 | DC | <DC#9 |
| 00DA | 0007 | DC | Z'0007' |
| 00DB | 0000 00D6 | DC | <SFCOMM+214 |
| 00DD | 0000 0261 | DC | <DC#4 |
| 00DF | 0000 0011 | DC | <SFCOMM+17 | STAT |
| 00E1 | 0005 | DC | Z'0005' |
| 00E2 | 0000 0250 | DC | <DC#2 |
| 00E4 | 0000 001E | DC | <SFCOMM+30 | WINDOW |
| 00E6 | 000D | DC | Z'000D' |
| 00E7 | 0000 0000 | DC | 0,0 |
| 00E9 | 0000 0000 | DC | 0,0 |
| 00EB | 0000 0000 | DC | 0,0 |
| 00ED | 0000 001C | DC | <SFCOMM+28 | NUMCOORDS |
| 00EF | 0000 001E | DC | <SFCOMM+30 | WINDOW |
| 00F1 | 0000 0000 | DC | 0,0 |
| 00F3 | 001F | DC | Z'001F' |
| 00F4 | 0000 | DC | Z'0000' |
| 00F5 | 0000 0293 | DC | <DC#10 |
| 00F7 | 0007 | DC | Z'0007' |
| 00F8 | 0000 00F3 | DC | <SFCOMM+243 |
| 00FA | 0000 0261 | DC | <DC#4 |
| 00FC | 0000 0011 | DC | <SFCOMM+17 | STAT |
| 00FE | 0020 | DC | Z'0020' |
| 00FF | 0000 | DC | Z'0000' |
| 0100 | 0000 02A3 | DC | <DC#11 |
| 0102 | 0007 | DC | Z'0007' |
| 0103 | 0000 00FE | DC | <SFCOMM+254 |
| 0105 | 0000 0261 | DC | <DC#4 |
| 0107 | 0000 0011 | DC | <SFCOMM+17 | STAT |
| 0109 | 0006 | DC | Z'0006' |
| 010A | 0000 | DC | Z'0000' |
| 010B | 0000 0021 | DC | <SFCOMM+33 | CHRSTAT |
| 010D | 0007 | DC | Z'0007' |
| 010E | 0000 0109 | DC | <SFCOMM+265 |
| 0110 | 0000 0000 | DC | 0,0 |
| 0112 | 0000 02B3 | DC | <DC#12 |
| 0114 | 0007 | DC | Z'0007' |

```
0115  0000 0109      DC    <SFCOMM+265
0117  0000 0261      DC    <DC#4
0119  0000 0011      DC    <SFCOMM+17      STAT
011B  0008           DC    Z'0008'
011C  0000 0000      DC    0,0
011E  0000 0000      DC    0,0
0120  0000 002C      DC    <SFCOMM+44      PARENTVEC
0122  0000 0000      DC    0,0
0124  0000 0000      DC    0,0
0126  001F           DC    Z'001F'
0127  0000           DC    Z'0000'
0128  0000 02B4      DC    <DC#13
012A  0007           DC    Z'0007'
012B  0000 0126      DC    <SFCOMM+294
012D  0000 0261      DC    <DC#4
012F  0000 0011      DC    <SFCOMM+17      STAT
0131  0005           DC    Z'0005'
0132  0000 0024      DC    <LSTEMP+36      T#19
0134  0000 001C      DC    <SFCOMM+28      NUMCOORDS
0136  002B           DC    Z'002B'
0137  0000           DC    Z'0000'
0138  0000 02C4      DC    <DC#14
013A  0007           DC    Z'0007'
013B  0000 0136      DC    <SFCOMM+310
013D  0000 0261      DC    <DC#4
013F  0000 0011      DC    <SFCOMM+17      STAT
0141  0013           DC    Z'0013'
0142  0000 0000      DC    0,0
0144  0000 0000      DC    0,0
0146  0000 0029      DC    <SFCOMM+41      VERTSLEN
0148  0000 02DA      DC    <DC#15
014A  0000 02DA      DC    <DC#15
014C  0000 0000      DC    0,0
014E  0000 0037      DC    <SFCOMM+55      HULLENGTH
0150  0000 0035      DC    <SFCOMM+53      TOLRNC
0152  0000 0000      DC    0,0
0154  0015           DC    Z'0015'
0155  0000           DC    Z'0000'
0156  0000 02DB      DC    <DC#16
0158  0007           DC    Z'0007'
0159  0000 0154      DC    <SFCOMM+340
015B  0000 0261      DC    <DC#4
015D  0000 0011      DC    <SFCOMM+17      STAT
015F  000F           DC    Z'000F'
0160  0000 0000      DC    0,0
0162  0000 0000      DC    0,0
0164  0000 0029      DC    <SFCOMM+41      VERTSLEN
0166  0000 02E6      DC    <DC#17
0168  0000 0029      DC    <SFCOMM+41      VERTSLEN
016A  0000 0038      DC    <SFCOMM+56      RPERIM
016C  0000 0000      DC    0,0
016E  000F           DC    Z'000F'
016F  0000 0000      DC    0,0
0171  0000 0000      DC    0,0
0173  0000 003C      DC    <SFCOMM+60      PMTRLEN
0175  0000 02E6      DC    <DC#17
0177  0000 003C      DC    <SFCOMM+60      PMTRLEN
0179  0000 003D      DC    <SFCOMM+61      CPERIM
017B  0000 0000      DC    0,0
017D  000F           DC    Z'000F'
017E  0000 0000      DC    0,0
0180  0000 0000      DC    0,0
0182  0000 0037      DC    <SFCOMM+55      HULLENGTH
0184  0000 02E6      DC    <DC#17
0186  0000 0037      DC    <SFCOMM+55      HULLENGTH
0188  0000 003F      DC    <SFCOMM+63      CAREA
018A  0000 0000      DC    0,0
018C  0000           DC    Z'000D'
018D  0000 0000      DC    0,0
018F  0000 0000      DC    0,0
0191  0000 002E      DC    <SFCOMM+46      START
0193  0000 002F      DC    <SFCOMM+47      END
0195  0000 02E7      DC    <DC#18
0197  0000 0011      DC    <SFCOMM+17      STAT
0199  000D           DC    Z'000D'
019A  0000 0000      DC    0,0
```

```
019C  0000 000E        DC    <SFCOMM+14         FVSIZE
019E  0000 0000        DC    0,0
01A0  0000 0000        DC    0,0
01A2  0000 0000        DC    0,0
01A4  0000 0000        DC    0,0
01A6  000D             DC    Z'000D'
01A7  0000 0000        DC    0,0
01A9  0000 0000        DC    0,0
01AB  0000 02E6        DC    <DC#17
01AD  0000 0000        DC    0,0
01AF  0000 02E7        DC    <DC#18
01B1  0000 0011        DC    <SFCOMM+17         STAT
01B3  000D             DC    Z'000D'
01B4  0000 0000        DC    0,0
01B6  0000 000F        DC    <SFCOMM+14         FVSIZE
01B8  0000 0000        DC    0,0
01BA  0000 0000        DC    0,0
01BC  0000 0000        DC    0,0
01BE  0000 0000        DC    0,0
01C0  000D             DC    Z'000D'
01C1  0000 0000        DC    0,0
01C3  0000 0000        DC    0,0
01C5  0000 02E6        DC    <DC#17
01C7  0000 0000        DC    0,0
01C9  0000 02E7        DC    <DC#18
01CB  0000 0011        DC    <SFCOMM+17         STAT
01CD  000D             DC    Z'000D'
01CE  0000 0000        DC    0,0
01D0  0000 000E        DC    <SFCOMM+14         FVSIZE
01D2  0000 002D        DC    <LSTEMP+45         T#27
01D4  0000 0000        DC    0,0
01D6  0000 0000        DC    0,0
01D8  0000 0000        DC    0,0
01DA  0029             DC    Z'0029'
01DB  0000 0000        DC    0,0
01DD  0000 000E        DC    <SFCOMM+14         FVSIZE
01DF  0000 0000        DC    0,0
01E1  0000 0027        DC    <SFCOMM+39         LEVEL
01E3  0000 0024        DC    <SFCOMM+36         SEGNUM
01E5  0000 0000        DC    0,0
01E7  0000 0000        DC    0,0
01E9  0000 0000        DC    0,0
01EB  0000 0029        DC    <SFCOMM+41         VERTSLEN
01ED  0000 002E        DC    <LSTEMP+46         T#28
01EF  0000 0000        DC    0,0
01F1  0000 0037        DC    <SFCOMM+55         HULLENGTH
01F3  0000 0000        DC    0,0
01F5  0000 004C        DC    <SFCOMM+76         WRKLEN
01F7  0000 0000        DC    0,0
01F9  0000 0000        DC    0,0
01FB  0000 003F        DC    <SFCOMM+63         CAREA
01FD  0000 0038        DC    <SFCOMM+56         RPERIM
01FF  0000 0041        DC    <SFCOMM+65         SMOOTH
0201  0000 0000        DC    0,0
0203  001F             DC    Z'001F'
0204  0000             DC    Z'0000'
0205  0000 02E9        DC    <DC#19
0207  0007             DC    Z'0007'
0208  0000 0203        DC    <SFCOMM+515
020A  0000 0261        DC    <DC#4
020C  0000 0011        DC    <SFCOMM+17         STAT
020E  0011             DC    Z'0011'
020F  0000 0000        DC    0,0
0211  0000 004A        DC    <SFCOMM+74         FVPOSO
0213  0000 0000        DC    0,0
0215  0000 0027        DC    <SFCOMM+39         LEVEL
0217  0000 002C        DC    <SFCOMM+44         PARENTVECT
0219  0000 0000        DC    0,0
021B  0000 0000        DC    0,0
021D  0000 0000        DC    0,0
021F  001F             DC    Z'001F'
0220  0000             DC    Z'0000'
0221  0000 02F9        DC    <DC#20
0223  0007             DC    Z'0007'
```

```
0224  0000 021F            DC    <SFCOMW+543
0226  0000 0261            DC    <DC#4
0228  0000 0011            DC    <SFCOMW+17        STAT
022A  0008                 DC    Z'0008'
022B  0000 0000            DC    0,0
022D  0000 0000            DC    0,0
022F  0000 0046            DC    <SFCOMW+70        HEADER
0231  0000 0000            DC    0,0
0233  0000 0000            DC    0,0
0235  0008                 DC    Z'0008'
0236  0000 0000            DC    0,0
0238  0000 0000            DC    0,0
023A  0000 0046            DC    <SFCOMW+70        HEADER
023C  0000 0000            DC    0,0
023E  0000 0000            DC    0,0
0240  0018                 DC    Z'0018'
0241  0000                 DC    Z'0000'
0242  0000 0309            DC    <DC#21
0244  0007                 DC    Z'0007'
0245  0000 0240            DC    <SFCOMW+576
0247  0000 0261            DC    <DC#4
0249  0000 0011            DC    <SFCOMW+17        STAT
024B  2020       DC#0      DC    Z'2020'
024C  4348       DC#1      DC    Z'4348'
024D  4E43                 DC    Z'4E43'
024E  4F44                 DC    Z'4F44'
024F  4520                 DC    Z'4520'
0250  0003       DC#2      DC    Z'0003'
0251  424C       DC#3      DC    Z'424C'
0252  4454                 DC    Z'4454'
0253  5245                 DC    Z'5245'
0254  3A20                 DC    Z'3A20'
0255  2054                 DC    Z'2054'
0256  454D                 DC    Z'454D'
0257  5020                 DC    Z'5020'
0258  4649                 DC    Z'4649'
0259  4C45                 DC    Z'4C45'
025A  2045                 DC    Z'2045'
025B  5252                 DC    Z'5252'
025C  4F52                 DC    Z'4F52'
025D  2028                 DC    Z'2028'
025E  4754                 DC    Z'4754'
025F  4649                 DC    Z'4649'
0260  4C29                 DC    Z'4C29'
0261  0000       DC#4      DC    Z'0000'
0262  424C       DC#5      DC    Z'424C'
0263  4454                 DC    Z'4454'
0264  5245                 DC    Z'5245'
0265  3A20                 DC    Z'3A20'
0266  2052                 DC    Z'2052'
0267  554E                 DC    Z'554E'
0268  5449                 DC    Z'5449'
0269  4D45                 DC    Z'4D45'
026A  2045                 DC    Z'2045'
026B  5252                 DC    Z'5252'
026C  4F52                 DC    Z'4F52'
026D  2028                 DC    Z'2028'
026E  424F                 DC    Z'424F'
026F  5244                 DC    Z'5244'
0270  5229                 DC    Z'5229'
0271  006C       DC#6      DC    Z'006C'
0272  424C       DC#7      DC    Z'424C'
0273  4454                 DC    Z'4454'
0274  5245                 DC    Z'5245'
0275  3A20                 DC    Z'3A20'
0276  2052                 DC    Z'2052'
0277  554E                 DC    Z'554E'
0278  5449                 DC    Z'5449'
0279  4D45                 DC    Z'4D45'
027A  2045                 DC    Z'2045'
027B  5252                 DC    Z'5252'
027C  4F52                 DC    Z'4F52'
027D  2028                 DC    Z'2028'
027E  5244                 DC    Z'5244'
```

| | | | | |
|---|---|---|---|---|
| 027F | 5349 | | DC | Z'5349' |
| 0280 | 4C48 | | DC | Z'4C48' |
| 0281 | 2920 | | DC | Z'2920' |
| 0282 | 0077 | DC#8 | DC | Z'0077' |
| 0283 | 424C | DC#9 | DC | Z'424C' |
| 0284 | 4454 | | DC | Z'4454' |
| 0285 | 5245 | | DC | Z'5245' |
| 0286 | 3A20 | | DC | Z'3A20' |
| 0287 | 2052 | | DC | Z'2052' |
| 0288 | 554E | | DC | Z'554E' |
| 0289 | 5449 | | DC | Z'5449' |
| 028A | 4D45 | | DC | Z'4D45' |
| 028B | 2045 | | DC | Z'2045' |
| 028C | 5252 | | DC | Z'5252' |
| 028D | 4F52 | | DC | Z'4F52' |
| 028E | 2028 | | DC | Z'2028' |
| 028F | 5859 | | DC | Z'5859' |
| 0290 | 434F | | DC | Z'434F' |
| 0291 | 4F52 | | DC | Z'4F52' |
| 0292 | 2920 | | DC | Z'2920' |
| 0293 | 424C | DC#10 | DC | Z'424C' |
| 0294 | 4454 | | DC | Z'4454' |
| 0295 | 5245 | | DC | Z'5245' |
| 0296 | 3A20 | | DC | Z'3A20' |
| 0297 | 2052 | | DC | Z'2052' |
| 0298 | 554E | | DC | Z'554E' |
| 0299 | 5449 | | DC | Z'5449' |
| 029A | 4D45 | | DC | Z'4D45' |
| 029B | 2045 | | DC | Z'2045' |
| 029C | 5252 | | DC | Z'5252' |
| 029D | 4F52 | | DC | Z'4F52' |
| 029E | 2028 | | DC | Z'2028' |
| 029F | 5654 | | DC | Z'5654' |
| 02A0 | 414E | | DC | Z'414E' |
| 02A1 | 474C | | DC | Z'474C' |
| 02A2 | 2920 | | DC | Z'2920' |
| 02A3 | 5752 | DC#11 | DC | Z'5752' |
| 02A4 | 4842 | | DC | Z'4842' |
| 02A5 | 5546 | | DC | Z'5546' |
| 02A6 | 2054 | | DC | Z'2054' |
| 02A7 | 4F4F | | DC | Z'4F4F' |
| 02A8 | 2053 | | DC | Z'2053' |
| 02A9 | 4D41 | | DC | Z'4D41' |
| 02AA | 4C4C | | DC | Z'4C4C' |
| 02AB | 2E20 | | DC | Z'2E20' |
| 02AC | 4255 | | DC | Z'4255' |
| 02AD | 464C | | DC | Z'464C' |
| 02AE | 454E | | DC | Z'454E' |
| 02AF | 204E | | DC | Z'204E' |
| 02B0 | 4545 | | DC | Z'4545' |
| 02B1 | 4445 | | DC | Z'4445' |
| 02B2 | 443D | | DC | Z'443D' |
| 02B3 | 00A3 | DC#12 | DC | Z'00A3' |
| 02B4 | 424C | DC#13 | DC | Z'424C' |
| 02B5 | 4454 | | DC | Z'4454' |
| 02B6 | 5245 | | DC | Z'5245' |
| 02B7 | 3A20 | | DC | Z'3A20' |
| 02B8 | 2046 | | DC | Z'2046' |
| 02B9 | 5620 | | DC | Z'5620' |
| 02BA | 5245 | | DC | Z'5245' |
| 02BB | 4144 | | DC | Z'4144' |
| 02BC | 2045 | | DC | Z'2045' |
| 02BD | 5252 | | DC | Z'5252' |
| 02BE | 4F52 | | DC | Z'4F52' |
| 02BF | 2028 | | DC | Z'2028' |
| 02C0 | 5244 | | DC | Z'5244' |
| 02C1 | 5645 | | DC | Z'5645' |
| 02C2 | 4354 | | DC | Z'4354' |
| 02C3 | 2920 | | DC | Z'2920' |
| 02C4 | 424C | DC#14 | DC | Z'424C' |
| 02C5 | 4454 | | DC | Z'4454' |
| 02C6 | 5245 | | DC | Z'5245' |
| 02C7 | 3A20 | | DC | Z'3A20' |
| 02C8 | 4C65 | | DC | Z'4C65' |
| 02C9 | 7373 | | DC | Z'7373' |
| 02CA | 2074 | | DC | Z'2074' |

| | | | | |
|---|---|---|---|---|
| 02CB | 6861 | | DC | Z'6861' |
| 02CC | 6E20 | | DC | Z'6E20' |
| 02CD | 3220 | | DC | Z'3220' |
| 02CE | 636F | | DC | Z'636F' |
| 02CF | 6F72 | | DC | Z'6F72' |
| 02D0 | 6469 | | DC | Z'6469' |
| 02D1 | 6E61 | | DC | Z'6E61' |
| 02D2 | 7465 | | DC | Z'7465' |
| 02D3 | 7320 | | DC | Z'7320' |
| 02D4 | 656E | | DC | Z'656E' |
| 02D5 | 636F | | DC | Z'636F' |
| 02D6 | 756E | | DC | Z'756E' |
| 02D7 | 7465 | | DC | Z'7465' |
| 02D8 | 7265 | | DC | Z'7265' |
| 02D9 | 6420 | | DC | Z'6420' |
| 02DA | 03E8 | DC#15 | DC | Z'03E8' |
| 02DB | 424C | DC#16 | DC | Z'424C' |
| 02DC | 4454 | | DC | Z'4454' |
| 02DD | 5245 | | DC | Z'5245' |
| 02DE | 3A20 | | DC | Z'3A20' |
| 02DF | 2043 | | DC | Z'2043' |
| 02E0 | 5648 | | DC | Z'5648' |
| 02E1 | 554C | | DC | Z'554C' |
| 02E2 | 4C20 | | DC | Z'4C20' |
| 02E3 | 6572 | | DC | Z'6572' |
| 02E4 | 726F | | DC | Z'726F' |
| 02E5 | 7220 | | DC | Z'7220' |
| 02E6 | 0001 | DC#17 | DC | Z'0001' |
| 02E7 | 0000 | DC#18 | DC | Z'0000' |
| 02E8 | 0000 | | DC | Z'0000' |
| 02E9 | 424C | DC#19 | DC | Z'424C' |
| 02EA | 4454 | | DC | Z'4454' |
| 02EB | 5245 | | DC | Z'5245' |
| 02EC | 3A20 | | DC | Z'3A20' |
| 02ED | 2052 | | DC | Z'2052' |
| 02EE | 554E | | DC | Z'554E' |
| 02EF | 5449 | | DC | Z'5449' |
| 02F0 | 4D45 | | DC | Z'4D45' |
| 02F1 | 2045 | | DC | Z'2045' |
| 02F2 | 5252 | | DC | Z'5252' |
| 02F3 | 4F52 | | DC | Z'4F52' |
| 02F4 | 2028 | | DC | Z'2028' |
| 02F5 | 4152 | | DC | Z'4152' |
| 02F6 | 4346 | | DC | Z'4346' |
| 02F7 | 4558 | | DC | Z'4558' |
| 02F8 | 2920 | | DC | Z'2920' |
| 02F9 | 424C | DC#20 | DC | Z'424C' |
| 02FA | 4454 | | DC | Z'4454' |
| 02FB | 5245 | | DC | Z'5245' |
| 02FC | 3A20 | | DC | Z'3A20' |
| 02FD | 2052 | | DC | Z'2052' |
| 02FE | 554E | | DC | Z'554E' |
| 02FF | 5449 | | DC | Z'5449' |
| 0300 | 4D45 | | DC | Z'4D45' |
| 0301 | 2045 | | DC | Z'2045' |
| 0302 | 5252 | | DC | Z'5252' |
| 0303 | 4F52 | | DC | Z'4F52' |
| 0304 | 2028 | | DC | Z'2028' |
| 0305 | 5550 | | DC | Z'5550' |
| 0306 | 4441 | | DC | Z'4441' |
| 0307 | 5445 | | DC | Z'5445' |
| 0308 | 2920 | | DC | Z'2920' |
| 0309 | 424C | DC#21 | DC | Z'424C' |
| 030A | 4454 | | DC | Z'4454' |
| 030B | 5245 | | DC | Z'5245' |
| 030C | 3A20 | | DC | Z'3A20' |
| 030D | 2052 | | DC | Z'2052' |
| 030E | 756E | | DC | Z'756E' |
| 030F | 7469 | | DC | Z'7469' |
| 0310 | 6D65 | | DC | Z'6D65' |
| 0311 | 2065 | | DC | Z'2065' |
| 0312 | 7272 | | DC | Z'7272' |
| 0313 | 6F72 | | DC | Z'6F72' |
| 0314 | 2E20 | | DC | Z'2E20' |
| 0315 | | LSTEMP | RESV | 47 |
| 0897 | | | ORG | Z'0897' |

What is claimed is:

1. A method of extracting information on the shape of an object, said method comprising the steps of:
   (a) generating a two dimensional digital image of said object shape, said image being comprised of points;
   (b) identifying the set of boundary points of said digital image;
   (c) ordering said boundary points;
   (d) at a first hierarchial level selecting a first convex hull subset of said boundary points wherein each point of said first subset is on an outermost portion of said boundary;
   (e) partitioning said boundary into segments of either a first or a second kind wherein each of said segments is a group of consecutively ordered ones of said set of boundary points and the endpoints of each of said segments are two points of said first convex hull subset, and wherein said segments of a first kind are smoother than said segments of a second kind according to selected criteria;
   (f) at the next hierarchial level selecting for each of said segments of a second kind from the previous hierarchial level a further convex hull subset of said boundary points wherein each point of said further subset is a boundary point on the outermost portions of the corresponding points of each of said segments of a second kind from the previous hierarchial level;
   (g) partitioning each of said segments of the second kind into further of said segments of either a first or second kind, according to said criteria;
   (h) repeating steps (f) and (g) for each of said segments of a second kind identified in step (g) until no further of said segments of a second kind are identified.

2. The method of claim 1 wherein said criteria are:
   in step (e), if, and only if, each of said boundary points of one of said segments are also one of said points of said first subset, said one of said segments is a segment of the first kind, otherwise said one of said segments is a segment of a second kind; and
   in step (g), if, and only if, each of said boundary points of said one of said segments are also one of said points of said further subset, said one of said segments is a segment of a first kind, otherwise said one of said segments is a segment of a second kind.

3. The method of claim 1 further including:
   determining the depth of each of said segments;
   combining all of said segments which are adjacent and which have a depth less than a selected value into a single of said segments.

4. The method of claim 3 wherein said value is 1.

5. The method of claim 1 wherein the boundary of said object has a maximum dimension in each of two orthogonal directions, and wherein said selecting of said first convex hull subset in step (d) comprises the further steps of:
   (d1) selecting a referral point which is located outside the area circumscribed by a rectangle whose length is the same as one of said maximum dimensions and whose width is the same as the other of said maximum dimensions of said object with said rectangle enclosing said image;
   (d2) selecting a boundary reference point and a reference line which extends through said referral point and said boundary reference point, extending direction lines between said boundary reference point and each of said other boundary points;
   (d3) respectively determining the angles between said direction lines and said reference line and selecting the minimum angles, identifying the boundary point associated with said minimum angle as a convex hull point;
   (d4) extending direction line between the last established one of said convex hull points and each succeeding one of said boundary points, respectively determining the angles between said direction lines and said reference line and selecting another minimum angle, and identifying the boundary point associated with said another minimum angle as the next convex hull point; and
   (d5) determining if said next convex hull point has been previously identified as a convex hull point and, if not, repeating step (d4) until no new one of said boundary points is added to said subsets of convex hull points.

6. The method of claim 1 wherein each of said segments of a second kind has established convex hull endpoints and a maximum dimension in each of two orthogonal directions, and wherein said selecting said further convex hull subset in step (f) for a particular one of said segments of a second kind, comprises the further steps of:
   (f1) selecting a segment referral point for said particular segment which is outside the area circumscribed by a rectangle whose length is the same as one of said maximum dimensions and whose width is the same as the other of said maximum dimensions, said rectangule enclosing said particular segment;
   (f2) selecting one of said convex hull endpoints as a segment reference point and selecting a segment reference axis for said particular segment which extends through said segment referral point and said selected convex hull endpoint, extending segment direction lines between said selected endpoint and each of the other boundary points of said particular segment to the other one of said endpoints;
   (f3) respectively determining the angles between said direction lines and said reference axis and selecting the minimum angle, identifying the boundary point associated with said minimum angle as the last determined convex hull point;
   (f4) determining if said last determining convex hull point is said other endpoint and, if not, extending direction lines between the last established one of said convex hull points and each succeeding one of said boundary points to said other one of said endpoints, and repeating steps (f3) and (f4) in order until no new boundary points are added to said further subset for said particular segment.

* * * * *